(12) United States Patent
Ohnishi

(10) Patent No.: US 6,512,310 B1
(45) Date of Patent: Jan. 28, 2003

(54) ELECTRO-MECHANICAL IMPACT DETECTING DEVICE FOR VEHICLES

(75) Inventor: Jun Ohnishi, Motosu-gun (JP)

(73) Assignee: Denso Corporation, Kariya (JP)

( * ) Notice: Subject to any disclaimer, the term of this patent is extended or adjusted under 35 U.S.C. 154(b) by 128 days.

(21) Appl. No.: 09/697,303

(22) Filed: Oct. 27, 2000

(30) Foreign Application Priority Data

Nov. 24, 1999 (JP) ............................................ 11-333125

(51) Int. Cl.[7] .............................................. H01H 35/00
(52) U.S. Cl. ........................ 307/121; 307/9.1; 307/10.1; 307/10.7
(58) Field of Search ......................... 307/121, 9.1, 10.1, 307/10.7

(56) References Cited

U.S. PATENT DOCUMENTS

| | | | |
|---|---|---|---|
| 3,764,820 A | * 10/1973 | White et al. | ................. 307/121 |
| 3,889,130 A | * 6/1975 | Breed | .......................... 307/121 |
| 5,233,141 A | * 8/1993 | Breed | .................... 200/61.45 R |
| 5,610,337 A | * 3/1997 | Nelson | ......................... 73/651 |
| 5,756,948 A | * 5/1998 | Husby et al. | ............. 200/61.53 |
| 5,821,851 A | * 10/1998 | Blackmer | .................... 340/467 |
| 5,898,144 A | 4/1999 | Sakai et al. | |
| 5,914,470 A | 6/1999 | Suzuki et al. | |
| 5,920,045 A | 7/1999 | Suzuki et al. | |
| 6,093,897 A | 7/2000 | Inoue et al. | |
| 6,093,898 A | 7/2000 | Sakamoto et al. | |

FOREIGN PATENT DOCUMENTS

| | | |
|---|---|---|
| DE | 198 57 521 A1 | 12/1998 |
| EP | 10096740 | 4/1998 |
| JP | 10-96740 | 4/1998 |

* cited by examiner

*Primary Examiner*—Brian Sircus
*Assistant Examiner*—Robert L. Deberadinis
(74) *Attorney, Agent, or Firm*—Harness, Dickey & Pierce, PLC

(57) ABSTRACT

An electro-mechanical impact detecting device for a vehicle is provided which implements a multi-stage control for vehicle occupant protection systems and improves the operational delay characteristics of the vehicle occupant protection systems at an irregular collision based on the setting of multiple impact levels which are detected. When a main rotor rotates by a certain amount against the exertion force of a moving contact, the moving contact and fixed contact close the circuit, thereby detecting the first impact level. When the main rotor further rotates against the exertion force of the torsional coil spring, the remaining two pairs of fixed contacts and close the circuits sequentially, thereby detecting the second and third impact levels, respectively.

9 Claims, 35 Drawing Sheets

ELECTRO-MECHANICAL IMPACT DETECTING DEVICE FOR VEHICLES

CROSS-REFERENCE TO RELATED APPLICATION

The present invention is related to Japanese patent application No. Hei. 11-333125, filed Nov. 24, 1999; the contents of which are incorporated herein by reference.

FIELD OF THE INVENTION

The present invention relates to an electro-mechanical impact detecting device, and more particularily, to an acceleration detecting device or collision detecting device suitable for a vehicle occupant protection system, vehicle airbag system or seat-belt pretensioner.

BACKGROUND OF THE INVENTION

A conventional electro-mechanical impact detecting device or collision detecting device is disclosed in JP-A No. Hei-9-306311. This device has a rotor with a weight positioned eccentric from the rotation shaft of the rotor. This device senses a vehicle collision when the rotor has rotated by a prescribed rotation value due to the eccentric mass of the weight. This means that the collision detecting device has its collision detection level corresponding to the prescribed rotation value of the rotor, and accordingly the device has a single detection level. This device produces a detection signal at a single impact level. However, when multi-stage control of the air-bag system is implemented, the dilating speed during an irregular collision rises. Without multi-stage control of the air-bag system, the system is incapable of timely air bag dilation, depending on the delay of collision detecting during irregular collision.

SUMMARY OF THE INVENTION

Accordingly, the present invention overcomes the aforementioned drawbacks by providing an electro-mechanical impact detecting device for a vehicle which uses multiple impact levels to detect impact acting on the vehicle. As a result, multi-stage control is used for the occupant protection system and collision detection is based on improved operational delay characteristics of the occupant protection system during an irregular collision.

In one aspect of the invention, a displacement member deviates in position by a exerting means force responsive to an impact acting on a vehicle. The present invention includes switches which close circuits sequentially at displacement values of the displacement member corresponding to at least a first and second impact levels of impact. The device detects at least a first and second impact level in response to closing the switches.

The switches trip to detect the first and second impact levels. The present invention has at least two impact levels sensed and, by using the operational time difference between the first impact level and second impact level and splitting the control domain into an ON part if the time difference is within a prescribed time length and an OFF part if it exceeds the time length, the air bag is dilated without delay. Moreover, by setting two or more prescribed time lengths, the collision can be divided into more divisions, e.g., OFF/ Lo/Hi or OFF/Lo/Mid/Hi.

In another aspect of the invention, a rotating member rotates about a center of rotation. The rotating member has a center of mass which is eccentric from the rotation center, and rotates about the rotation center against an exertion force of exerting means in response to an impact on the vehicle. Switches close circuits sequentially at rotation values of the rotating member corresponding to at least first and second impact levels, and the device detects at least the first and second impact levels in response to the closing switches.

In another aspect of the invention, a displacement member is supported to deviate in the axial direction against an exertion force of exerting means in response to impact. Also, switches are provided which close circuits sequentially at axial displacement values of the displacement member corresponding to at least a first and second impact levels of impact. The impact detecting device detects at least the first and second impact levels in response to the switches closing.

In another aspect of the invention, the exerting means includes a first spring which exerts a force on the rotating member toward an initial rotation position. At least one or more second springs exert forces simultaneously or sequentially on the rotating member against rotation after the rotating member has rotated by a certain amount against the force of the first spring.

In another aspect of the invention, the exerting means includes a first spring which exerts a force on the displacement member toward an initial axial displacement position. At least one second spring exerts forces simultaneously or sequentially on the displacement member against the displacement thereof after the displacement member has deviated by a certain displacement against the exertion force of the first spring.

In another aspect of the invention, the impact detecting device includes a cam provided on the rotating member concentrically with the rotation center and adapted to rotate integrally with the rotating member in response to impact. The switches include fixed contacts and flat-spring moving contacts which are in contact with the surface of the cam. The switches are pushed and bent as the cam rotates and contacts the fixed contacts to close the circuits. At the contact surface, the cam surface is shaped such that the cam does not increase the bending value of the moving contacts.

In another aspect of the present invention, at least the first or second springs works also as the flat-spring moving contact. This reduces component parts. In another aspect, an exerting means comprises flat exerting springs which extend from a root section toward the cam and align in the direction of push of the cam. The exerting flat springs have no spacing at their root section from each other.

This eliminates contact movement during contact between the flat exerting springs. Consequently, the creation of frictional force between the flat exerting springs is eliminated and the operational fluctuation of the impact detecting device can be reduced.

In another aspect, an auxiliary rotor is located concentrically with the rotation center of the rotating member, and the second spring comprises a plurality of springs. One of the second springs is a torsional spring located concentrically with the rotation center of the rotating member. The torsional spring has one end fixed to a stationary member and another end fixed to part of the auxiliary rotor. The torsional spring exerts a force on the rotating member through the auxiliary rotor against the rotation of the rotating member. When an exertion force of the torsional spring of the rotating member is imposed, the torsional spring has another end that twists and prevents increase of operational fluctuation of the impact detecting device.

In another aspect, the impact detecting device includes a cam provided on the rotating member concentric with the rotation center and rotates integral with the rotating member in response to impact. The switches include fixed contacts and flat-spring moving contacts in contact with the surface of the cam. The switches are pushed and bent as the cam rotates and contact the fixed contacts to close the circuits. The switches have equal spacing between the fixed contacts and moving contacts. The cam contact surface is formed to shift in position along the rotation direction of the cam. This prevents the flat-spring contacts from being damaged by chattering or exceeding the spring stress limit.

In another aspect, the present invention includes a detection signal generation means that generates detection signals in response to closing of the switches at stepped values which match with at least the first and second impact levels. In another aspect, the second impact level is set greater than the first level. The detection signal generation means includes first and second electrical load elements, and is an electrical closing circuit having a closed switch at the first impact level and the first electrical load element, and another closing circuit having a closed switch at the second impact level and the first and second electrical load elements.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE INVENTION

Figure 1:
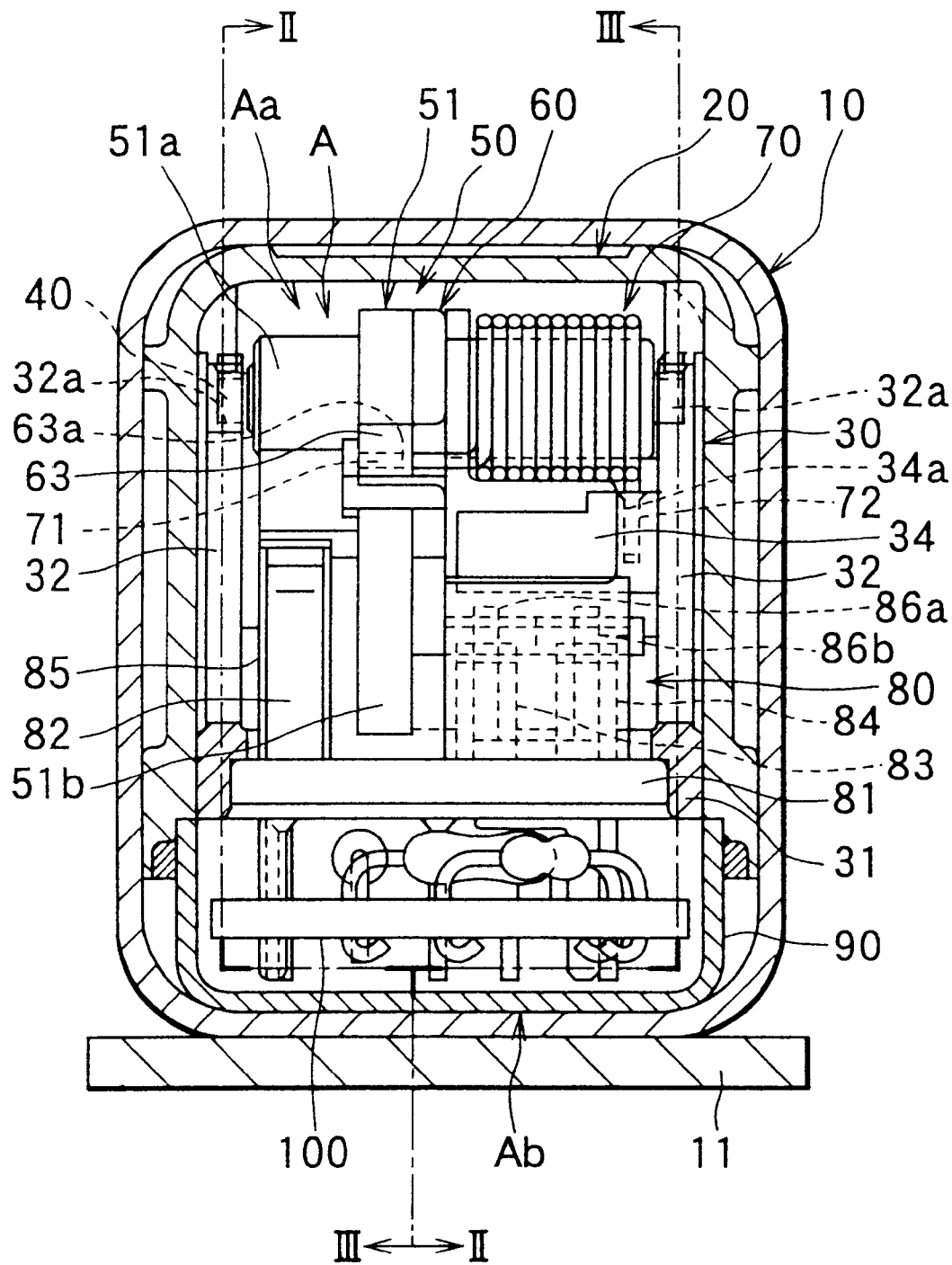
FIG. 1 is a cross-sectional view along the line 1—1 of FIG. 3 of an electro-mechanical impact detecting device according to the present invention.
Figure 2:
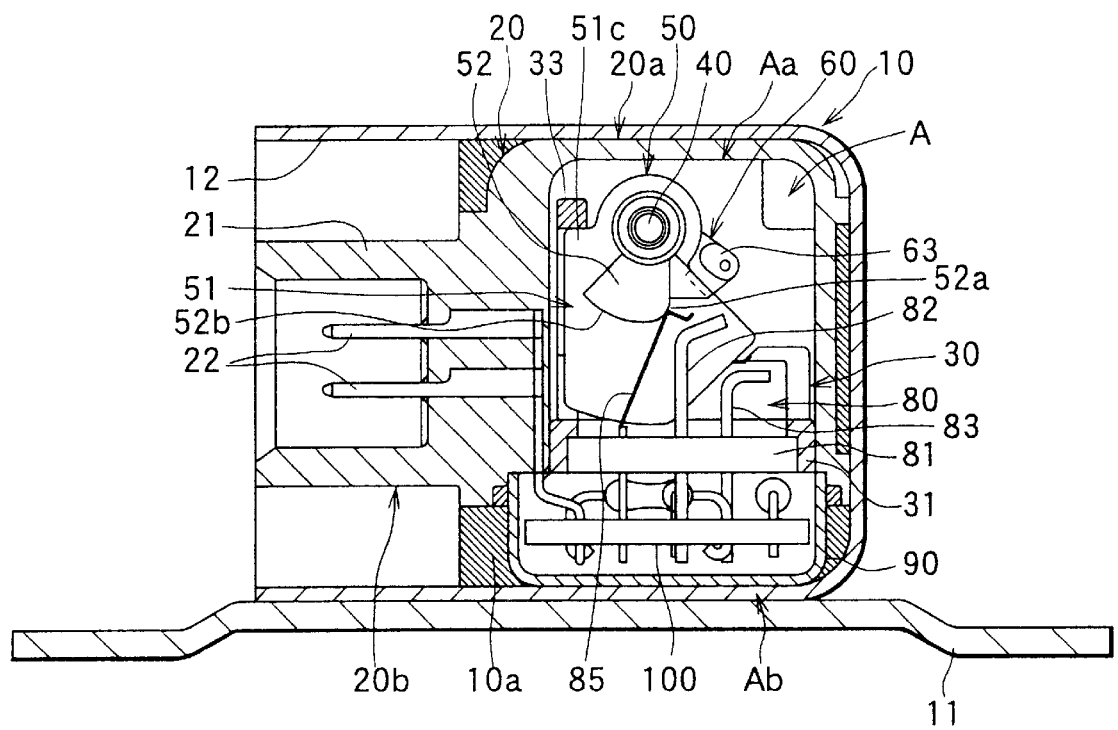
FIG. 2 is a cross-sectional view taken along line 2—2 of FIG. 1 of an electro-mechanical impact detecting device according to the present invention.
Figure 3:
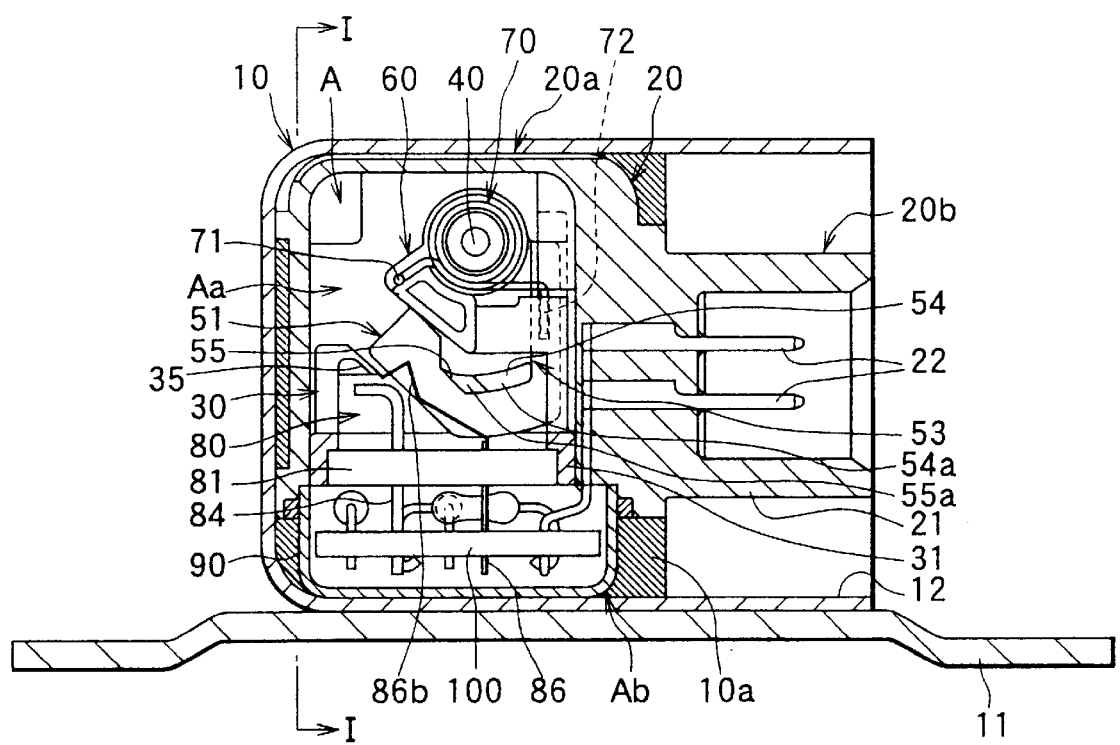
FIG. 3 is a cross-sectional view taken along line 3—3 of FIG. 1 of an electro-mechanical impact detecting device according to the present invention.
Figure 4:
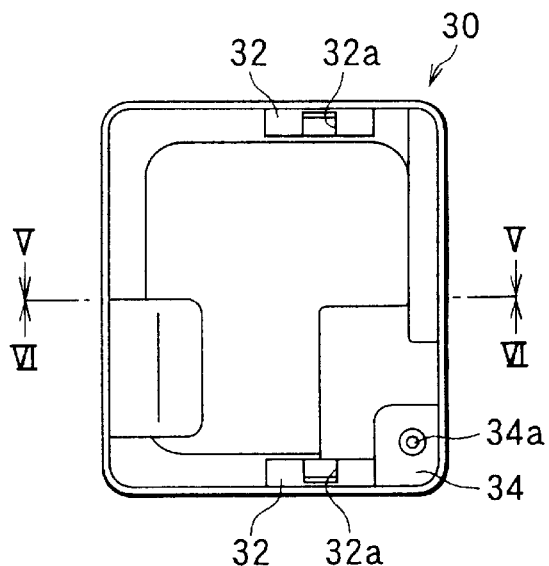
FIG. 4 is a plan view of the casing 30 of an electro-mechanical impact detecting device according to the present invention.

FIG. 1 through FIG. 3 show a first embodiment of the electro-mechanical impact detecting device based on the present invention. This device is preferably for automobile air-bag systems. The device has an outer housing 10 and an inner housing 20, of which the housing 10 is fixed to the vehicle body by a bracket 11 which is attached to the lower wall of the housing.

Inner housing 20 is fitted in the outer housing 10 as shown in FIG. 1 through FIG. 3. The housing 20 has a connector 20b which extends from and is integral with a housing section 20a, and the housing section 20a is located on the bottom of the housing 10. The connector 20b is located in the opening section of the housing 10. The connector 20b confronts the outside at its connecting section 21 through an opening 12 of the housing 10. In FIG. 2, symbol 22 indicates terminals of the connector 20b. In FIG. 1 and FIG. 2, symbol 10a indicates hermetic filling material.

This impact detecting device has a main body A, which is fitted in both housings 10 and 20 as shown in FIG. 1 through FIG. 3. The device main body A includes a mechanical section Aa and an electrical circuit section Ab. The mechanical section Aa is fitted in the housing section 20a of the inner housing 20, and the electrical circuit section Ab is fitted in the housing 10 on the lower wall of the housing section 20a.

The mechanical section Aa includes a casing 30, a rotation shaft 40, a main rotor 50, an auxiliary (sub) rotor 60, a torsional coil spring 70, and a contact mechanism 80. The casing 30 is fitted in the housing section 20a. The casing 30 is made of electrically insulating synthetic resin, which is shaped as shown in FIG. 4 through FIG. 9. The casing 30 is seated by being coupled at its rectangular annular root section 31 (refer to FIG. 5 through FIG. 9) downward in FIG. 1 through FIG. 3 onto a base 81 of the contact mechanism 80 (will be explained later).

The rotation shaft 40 has both ends pivotally mounted in recess sections 32a at the top of support columns 32 (refer to FIG. 5 through FIG. 7) of the casing 30. The main rotor 50 is coupled concentrically with the rotation shaft 40 together with the sub rotor 60 and torsional coil spring 70.

The main rotor 50 has a plate weight 51 and plate cams 52 and 53. The weight 51 is shaped so that the weight center is eccentric from the rotation center as shown in FIG. 1 through FIG. 10. Specifically, the weight 51 is a stepped cylindrical boss 51a located at the rotation center. A weight section 51b is provided which causes the weight center to be eccentric from the boss 51a. The weight 51 is coupled concentrically to the left-side section in FIG. 1 of the rotation shaft 40 by means of the boss 51a, so that the weight section 51b is located below the rotation shaft 40.

Figure 5:
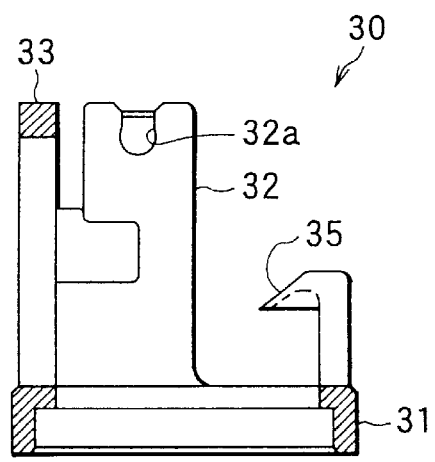
FIG. 5 is a cross-sectional view taken along line 5—5 of FIG. 4 of an electro-mechanical impact detecting device according to the present invention.
Figure 6:
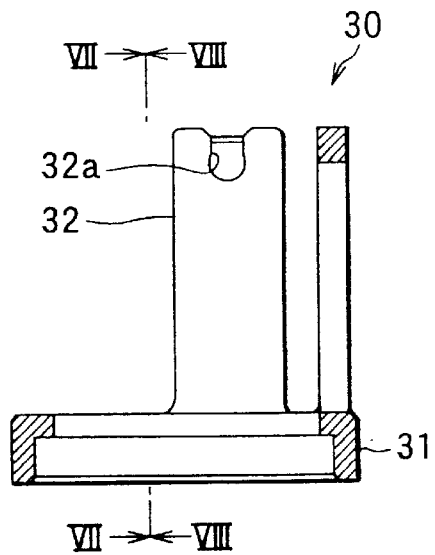
FIG. 6 is a cross-sectional view taken along line 6—6 of FIG. 4 of an electro-mechanical impact detecting device according to the present invention.
Figure 7:
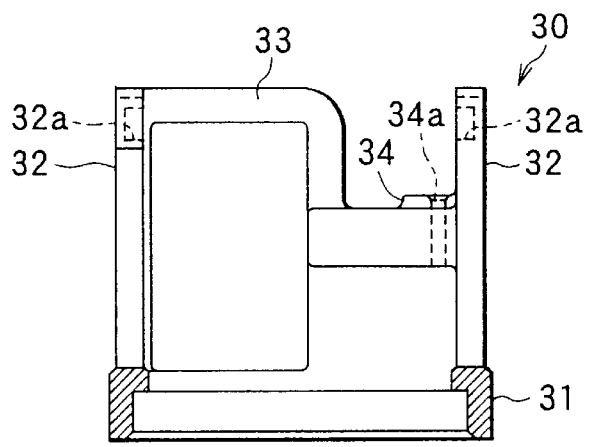
FIG. 7 is a cross-sectional view taken along line 7—7 of FIG. 6 of an electro-mechanical impact detecting device according to the present invention.
Figure 8:
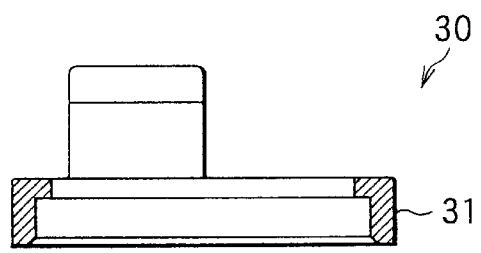
FIG. 8 is a cross-sectional view taken along the line 8—8 of FIG. 6 of an electro-mechanical impact detecting device according to the present invention.
Figure 9:
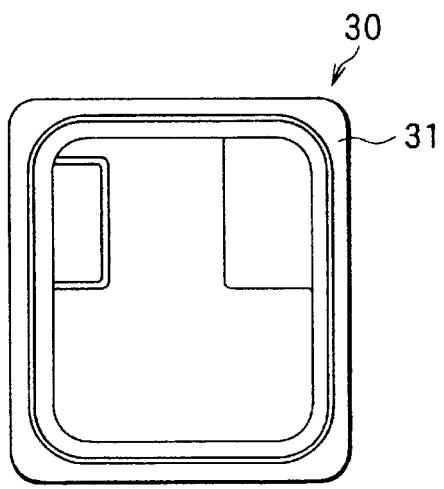
FIG. 9 is plan view of a bottom portion of a casing of an electro-mechanical impact detecting device according to the present invention.

Accordingly, the weight 51 having the eccentric weight center from the rotation center locks initially at the shoulder section 15c of the weight section 51b upward against the upper-end stopper 33 of the casing 30 (refer to FIG. 2 and FIG. 5). The upper-end stopper 33 works for the initial stopper of the weight 51.

Figure 10:
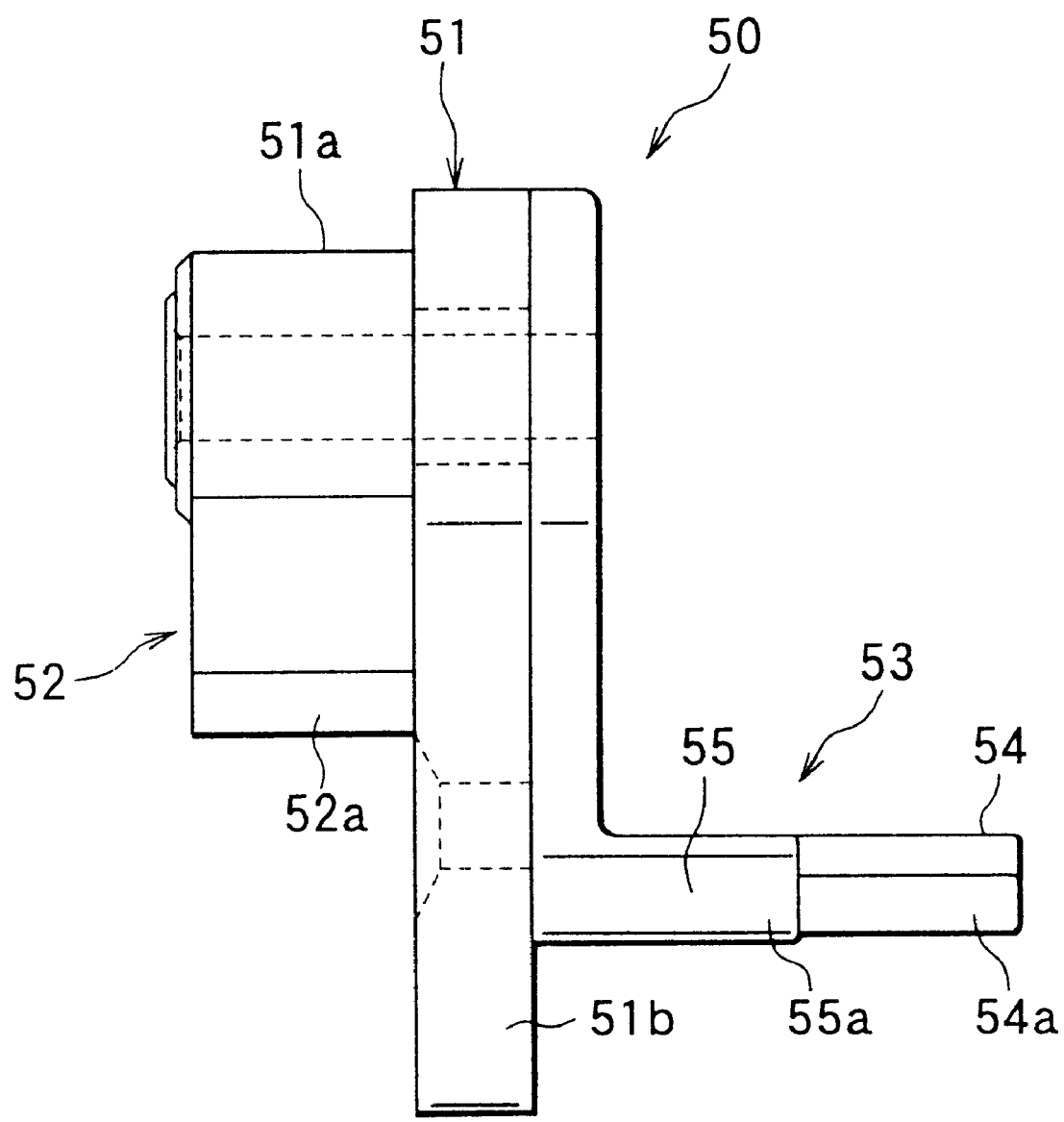
FIG. 10 is a plan view of the main rotor of the first embodiment of an electro-mechanical impact detecting device according to the present invention.
Figure 11:
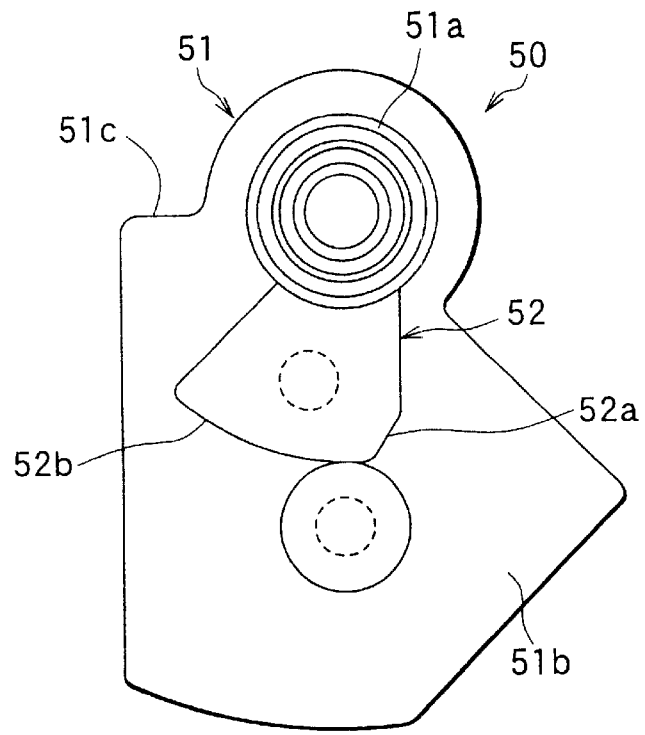
FIG. 11 is a right side view of a main rotor of an electro-mechanical impact detecting device according to the present invention.

The cam 52 is formed integral with the weight section 51b to extend along the left-side plane of the weight section 51b from a small-diameter section of the boss 51a in FIG. 10. Also, the cam 52 is formed with a plate shape as shown in FIG. 10 and FIG. 11. The cam 52 has two cam surfaces 52a and 52b, and the cam surface 52b has an arcuate profile which is centered by the rotation center of the boss 51a, i.e., the rotation shaft 40. The cam surface 52a has a planar shape to crisscross the cam surface 52b right-upwardly from the right extreme of FIG. 11.

Figure 12:
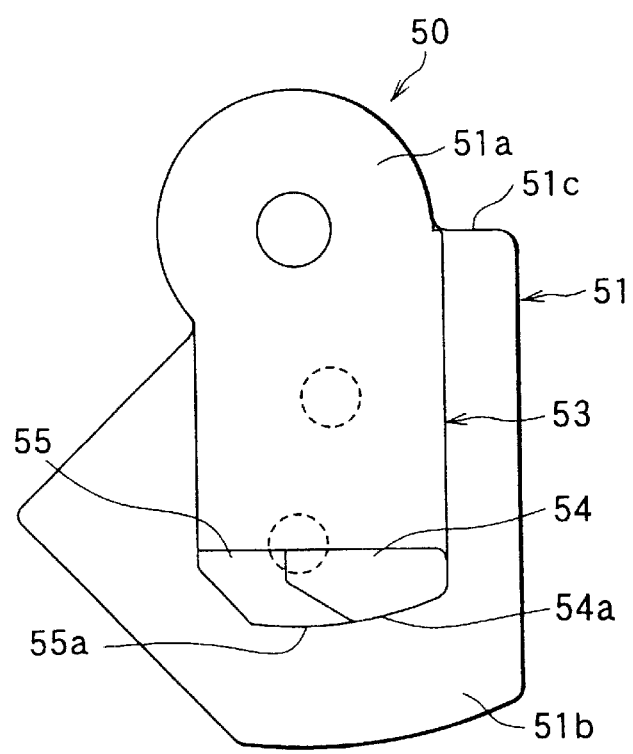
FIG. 12 is a left side view of the main rotor of an electro-mechanical impact detecting device according to the present invention.

The cam 53 is formed integral with the weight section 51b to extend along the right-side plane of the weight section 51b from a large-diameter section of the boss 51a in FIG. 10. The cam 53 is formed as an L-shape plate as shown in FIG. 10 and FIG. 12. The cam 53 has two cam sections 54 and 55, with the cam section 54 being located on the right of the cam section 55 in FIG. 12.

The cam section 54 extends a length longer than the cam section 55 to the right from the right-side plane of the weight section 51b as shown in FIG. 10. The cam section 54 has an arcuate cam surface 54a centered by the rotation shaft of weight 51. The cam section 55 has an arcuate cam surface 55a centered by the rotation shaft of the weight 51.

Figure 13:
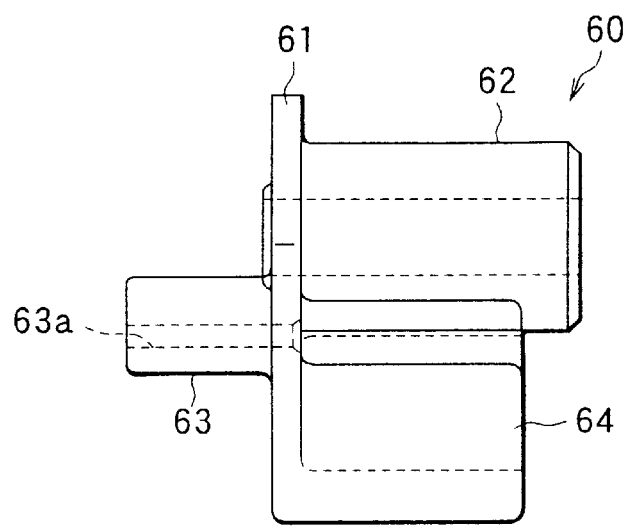
FIG. 13 is a plan view of a sub rotor of an electro-mechanical impact detecting device according to the present invention.
Figure 14:
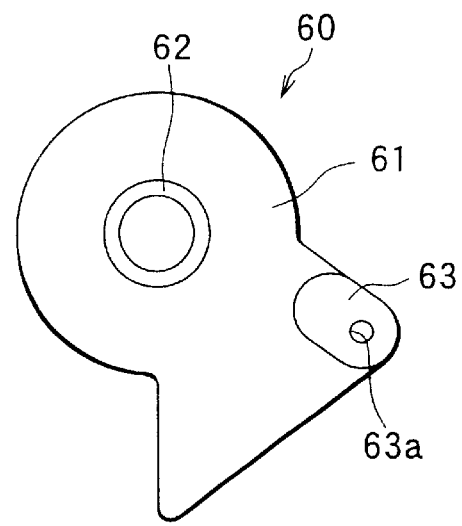
FIG. 14 is a right side view of the sub rotor of an electro-mechanical impact detecting device according to the present invention.
Figure 15:
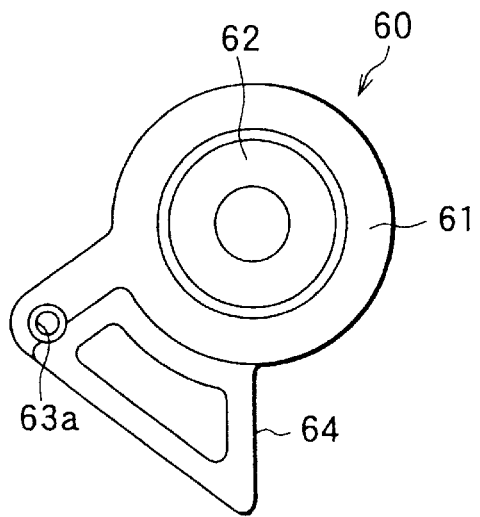
FIG. 15 is a left side view of the sub rotor of an electro-mechanical impact detecting device according to the present invention.
Figure 16:
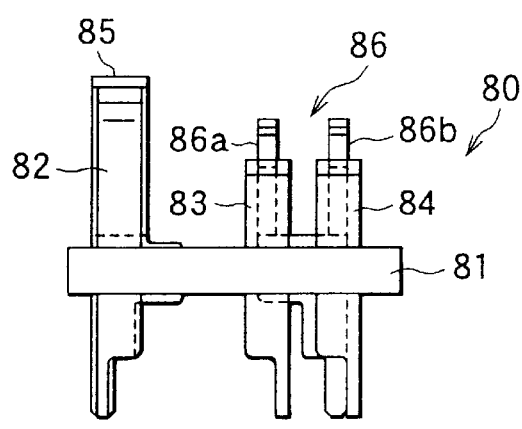
FIG. 16 is a front view of the contact mechanism of an electro-mechanical impact detecting device according to the present invention.

The sub rotor 60 is coupled concentrically to the rotation shaft 40 in its section between the main rotor 50 and torsional coil spring 70 as shown in FIG. 1. The sub rotor 60 has a plate rotor section 61, a cylindrical boss section 62, an arm section 63 and a trapezoidal coupling section 64. These elements are formed as integral members as shown in FIG. 13 through FIG. 15.

The boss section 62 is normal to the plane of the plate rotor section 61, and the boss section 62 is coupled concentrically to the rotation shaft 40. The arm section 63 extends from the left-side plane of the rotor section 61 in FIG. 13, parallel to the axis of the boss section 62 and in the direction opposite to the boss section 62. The trapezoidal coupling section 64 is formed on the rotor section 61 on the same side as the boss section 62 and at the position with respect to the boss section 62 shown in FIG. 13 through FIG. 15.

The torsional coil spring 70 is coupled concentrically to the rotation shaft 40 at its section between the sub rotor 60 and a side support section 32 of the casing 30 as shown in FIG. 1. The torsional coil spring 70 has one end section 71 stopped in a stop hole section 63a of the arm section 63 of the sub rotor 60. The torsional coil spring 70 has another end 72 stopped in a stop hole 34a which is formed in the wall section 34 of the casing 30 (refer to FIG. 1, FIG. 3, FIG. 4 and FIG. 7). As a consequence, the torsional coil spring 70 has a torsional force exertion on the sub rotor 60 in the rotation direction downwardly in FIG. 1 (clockwise direction of the main rotor 50 in FIG. 2) based on the stop hole 34a.

The contact mechanism 80 has a base 81 as shown in FIG. 1 through FIG. 3. This base 81 is coupled into the root section 31 of the casing 30 as mentioned above. The contact mechanism 80 has fixed contacts 82, 83 and 84 formed of elongate plates and moving contacts 85 and 86 formed of elongate plates as shown in FIG. 1, FIG. 2 and FIG. 16 through FIG. 19.

The fixed contact 82 is fixed into the base 81 in its thickness direction on the left side of the main rotor 50 in FIG. 1, together with the moving contact 85. The fixed contacts 83 and 84 are fixed into the base 81 in its thickness direction on the right side of the main rotor 50 in FIG. 1 together with the moving contact 86. The fixed contacts 82, 83 and 84 are formed of a rigid, electro-conductive, metallic material, and the moving contacts 85 and 86 are formed of an electro-conductive spring material.

The moving contact 85 is located to confront the fixed contact 82, and constitutes a normally-open switch (will be called a first switch hereinafter) in unison with the fixed contact 82. The moving contact 86 has split moving contact sections 86a and 86b, and these moving contact sections 86a and 86b are located to confront the fixed contacts 83 and 84 and constitute normally-open switches (will be called second and third switches hereinafter) in unison with the fixed contacts 83 and 84, respectively.

Figure 17:
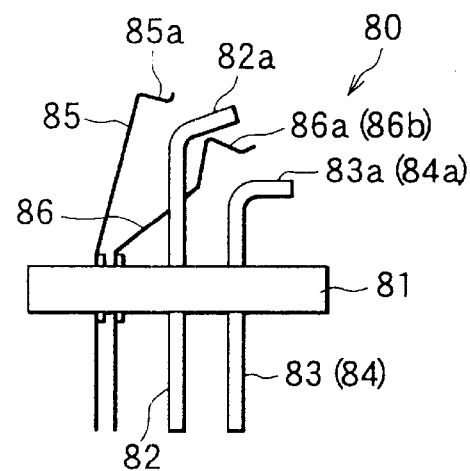
FIG. 17 is a right side view of the contact mechanism of an electro-mechanical impact detecting device according to the present invention.
Figure 19:
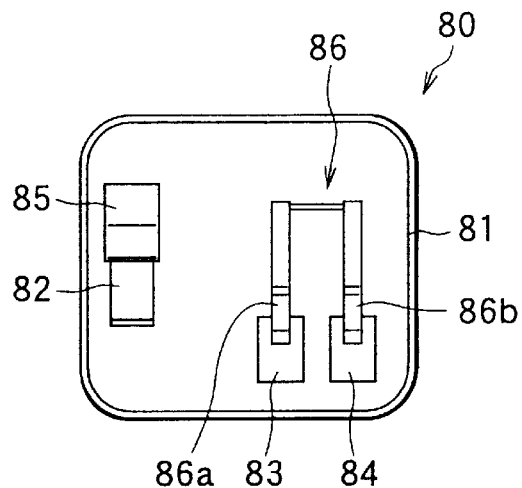
FIG. 19 is a plan view of the contact mechanism of an electro-mechanical impact detecting device according to the present invention.
Figure 18:
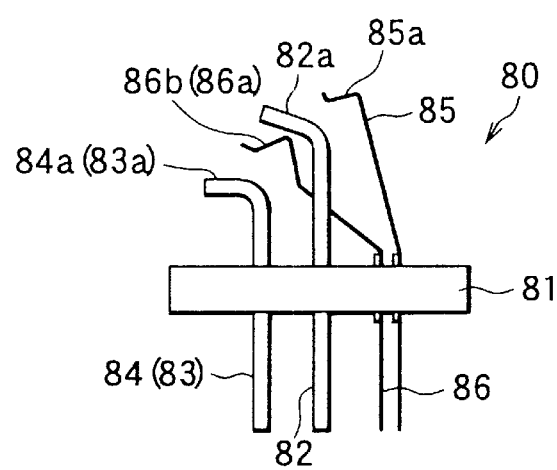
FIG. 18 is a left side view of the contact mechanism of an electro-mechanical impact detecting device according to the present invention.

The fixed contacts 82, 83 and 84 have their upper tip sections 82a, 83a and 84a bent in the counterclockwise rotation direction of the main rotor 50 in FIG. 2. The moving contact 85 has its tip section 85a bent with an L-shape toward the tip section 82a of the fixed contact 82, and the moving contact 86 has its moving contact sections 86a and 86b bent to have an L-shape as shown in FIG. 17.

The fixed contacts 83 and 84 have their upper tip sections 83a and 84a formed with an L-shape configuration. The fixed contact 82 has its upper tip section 82a bent less than the upper tip sections 83a and 84a. The fixed contacts 82, 83 and 84 and the moving contacts 85 and 86 are oriented in a thickness direction to the counterclockwise rotation direction of the main rotor 50 in FIG. 2. The moving contact 86 locks upward in FIG. 3 against a stopper 35 of the casing 30 against the resilient force of the moving contact sections 86a and 86b to prevent chattering.

The electrical circuit section Ab is provided with a rid 90 having a U-shaped cross section, and a printed circuit board 100 mounted inside. Planted on the printed circuit board 100 are fixed contacts 82, 83 and 84 and moving contacts 85 and 86 of the contact mechanism 80, which are connected electrically to the wiring section of the printed circuit board 100.

The electrical circuit section Ab has resistors R1 through R3 as shown in FIG. 1 through FIG. 3 and FIG. 20. Resistors R1 through R3 are connected in series. The resistor R1 is connected between the lower end sections of the fixed contact 82 and moving contact 85 by way of the printed circuit board 100.

The resistor R2 is connected at one end to the moving contact section 86a of the moving contact 86 by resistor R1, the lower end section of the moving contact 86 and the printed circuit board 100. The resistor R2 has another end connected to the lower end section of the fixed contact 83 by printed circuit board 100. The resistor R3 is connected at one end to the moving contact section 86b of the moving contact 86 by resistors R2 and R1, the lower end section of the moving contact 86 and the printed circuit board 100. The resistor R3 has another end connected to the lower end section of the fixed contact 84 by printed circuit board 100.

Figure 21:
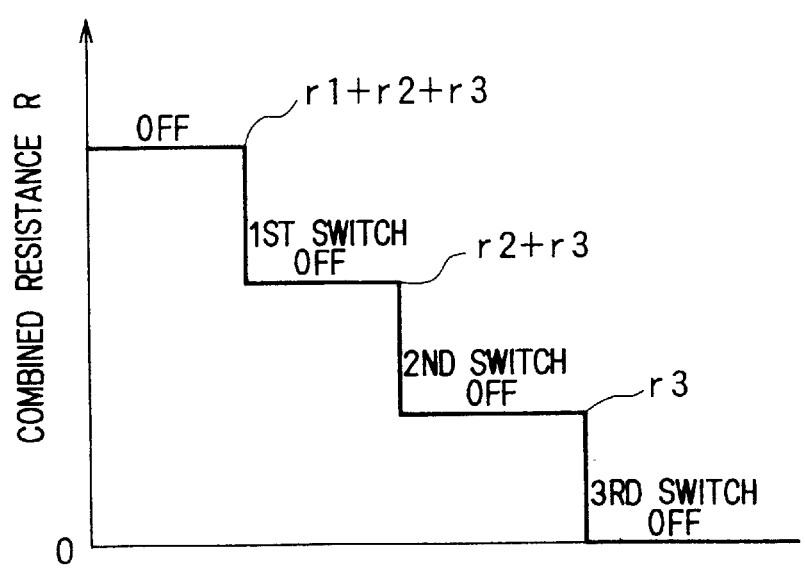
FIG. 21 is a diagram showing the relation between the composite resistance values and the closing of the first through third switches of the circuit arrangement of FIG. 20 of an electro-mechanical impact detecting device according to the present invention.

Assuming the resistors R1, R2 and R3 have resistance values r1, r2 and r3, respectively, when the first switch formed of the moving contact 85 and fixed contact 82, the second switch formed of the moving contact section 86a of the moving contact 86 and fixed contact 83, and the third switch formed of the moving contact section 86b and fixed contact 84 are all open, the electrical circuit section Ab has a composite resistance R which is equal to the sum of the r1, r2 and r3 (refer to FIG. 21). When only the first switch is closed, the composite resistance R is equal to the sum of r2 and r3 (refer to FIG. 21). When the second switch is closed, regardless of the state of the first switch, the composite resistance R is equal to the r3 (refer to FIG. 21). When the third switch is closed, the composite resistance is zero (refer to FIG. 21).

Figure 22:
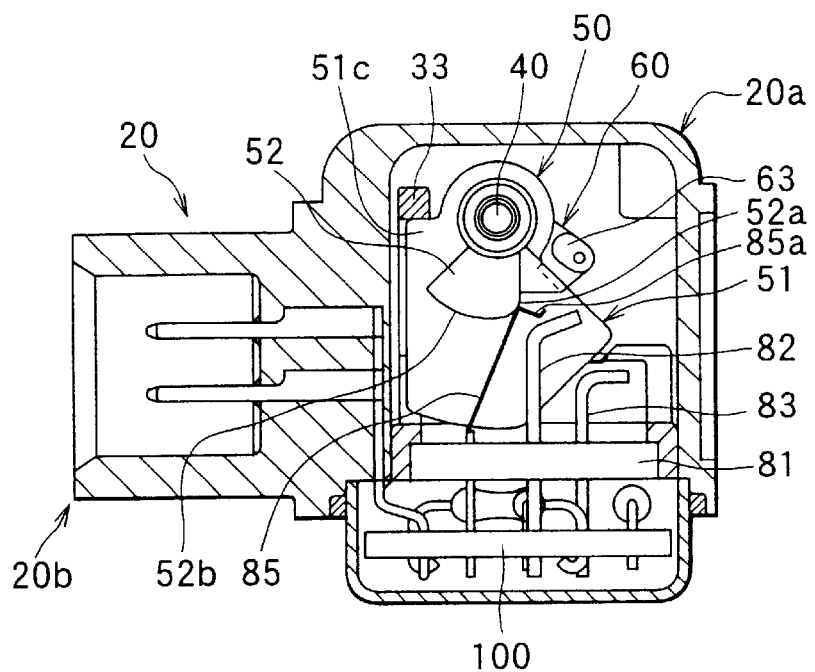
FIG. 22 is a diagram showing the initial state of the impact detecting device of an electro-mechanical impact detecting device according to the present invention.
Figure 23:
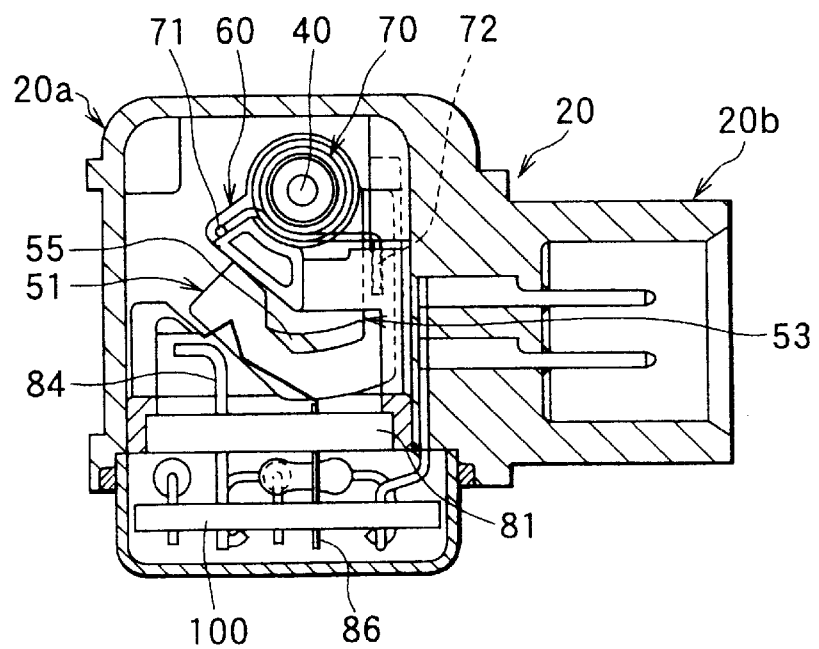
FIG. 23 is a diagram showing the initial state of the impact detecting device of an electro-mechanical impact detecting device according to the present invention.

In the first embodiment as described above, when the main rotor 50 has a position (initial position) shown in FIG. 2, FIG. 22 and FIG. 23, the weight 51 locks upward at its shoulder section 15c against the upper-end stopper 33 of the casing 30 (refer to FIG. 2 and FIG. 22). At this time, the first through third switches are all open, with the tip section 85a of the moving contact 85 having its root section being in right-to-left contact with the cam surface 52a of the cam 52 of the main rotor 50.

Figure 24:
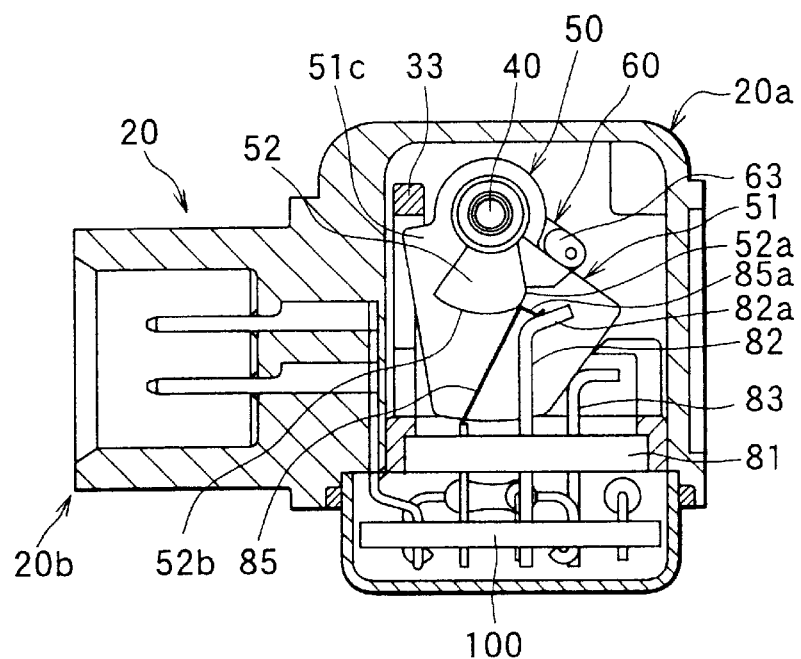
FIG. 24 is a diagram showing the state when the weight rotates to come in contact with the sub rotor of an electro-mechanical impact detecting device according to the present invention.

In this state, if the vehicle in a running state comes to a sudden stop as in the case of a collision, the vehicle decelerates. When force caused by the deceleration acts on the main rotor 50 rightward in FIG. 2, the weight 51 has a moment of inertia at the weight center due to the eccentric weight center of the weight 51 from the axis of the rotation shaft 40 (which is also the rotation center of the weight 51). As a result, it begins to rotate counterclockwise in FIG. 24 about the rotation shaft 40 axis.

Figure 25:
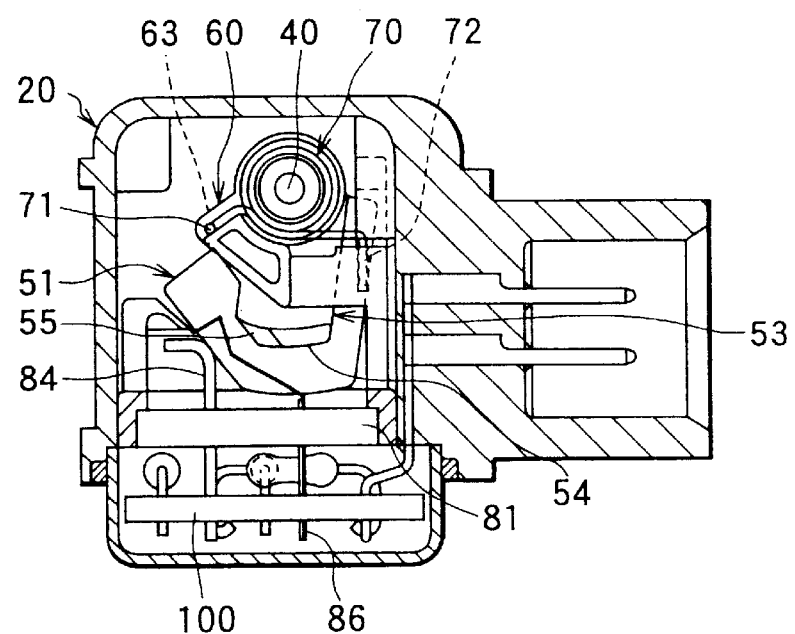
FIG. 25 is a diagram showing the state when the weight rotates to come in contact with the sub rotor of an electro-mechanical impact detecting device according to the present invention.

Accordingly, the tip section 85a of the moving contact 85 has its root section being in right-to-left contact with the cam surface 52a, and the tip section 85a of the moving contact 85 is pushed rightward and deformed elastically by the cam surface 52a as the main rotor 50 rotates in the counterclockwise direction. Due to the displacement, the moving contact 85 contacts, at its tip section 85a, with the tip section 82a of the fixed contact 82 (refer to FIG. 24). As the main rotor 50 further rotates in the same direction, the cam 52 increases the contact force at its cam surface 52 between the tip section 85a of the moving contact 85 and the tip section 82a of the fixed contact 82. When the displacement of the moving contact 85 due to the increased contact force reaches a certain value, the main rotor 50 contacts, at its weight 51, with the arm 63 of the sub rotor 60 (refer to FIG. 25).

Figure 26:
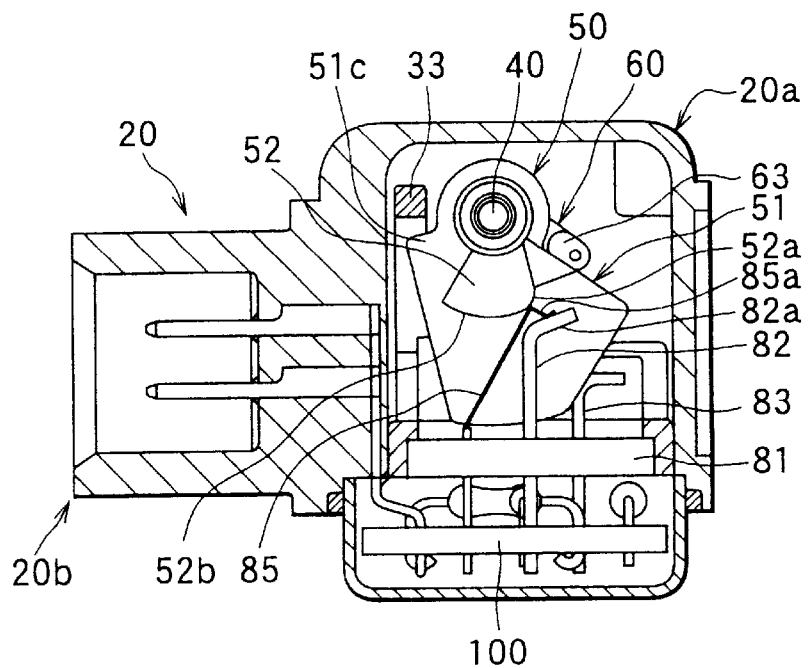
FIG. 26 is a diagram showing the state when the cam 52 rotates, causing the moving contact 85 to become in contact with the cam surface 52b of an electro-mechanical impact detecting device according to the present invention.

When main rotor 50 further rotates in the same direction, it is subjected to torsional force by torsional coil spring 70 in the opposite rotation direction. If the main rotor 50 further rotates in the same direction against the torsional force of the torsional coil spring 70, the tip section 85a of the moving contact 85, in contact with the cam surface 52a, begins to leave the cam surface 52a and contact cam surface 52b (refer to FIG. 26). Since the cam surface 52b has an arcuate profile, centered by the rotation center of the main rotor 50, the moving contact 85 does not increase the bend any longer against the cam surface 52b. Accordingly, out of forces acting on the main rotor 50 by the moving contact 85, the exertion force becomes zero and there is only a frictional force between the moving contact 85 and the cam surface 52b of the cam 52.

If it is assumed that moving contact 85 goes on deviating with the rotation of the main rotor 50 after contacting cam surface 52b, the main rotor 50 would be subjected to the exertion force of the moving contact 85 and the frictional force of the moving contact 85 on the cam surface 52b, in addition to the torsional force of the torsional coil spring 70. In consideration of the fluctuation of the second and third impact levels (refer to FIG. 33) to be detected by the impact detecting device, it is advantageous to make the number of forces acting on the main rotor 50 as small as possible. Accordingly, in this embodiment, to reduce the number of forces acting on the main rotor 50, the cam surface 52b to contacting the moving contact 85 is formed to have an arcuate profile centered by the rotation center of the main rotor 50 as described above.

Figure 27:
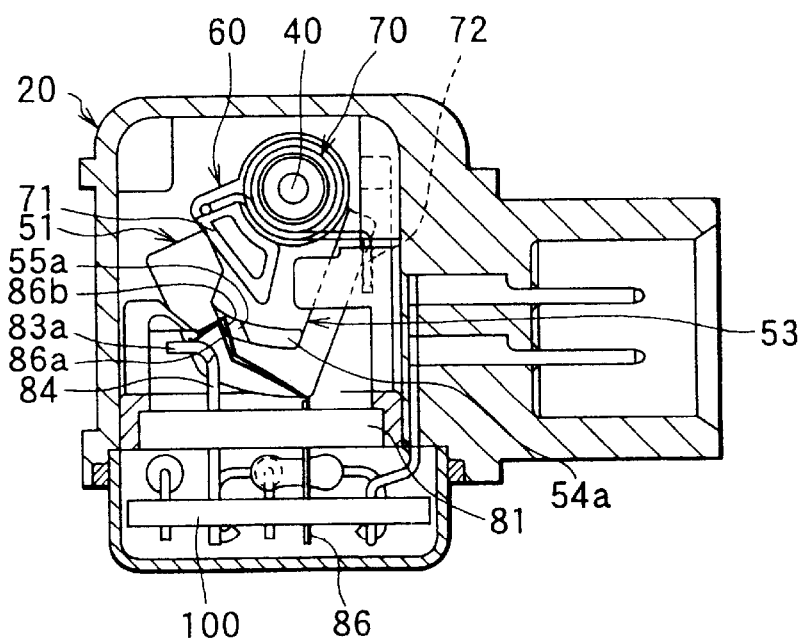
FIG. 27 is a diagram showing the state of the cam 53 when the cam 52 rotates, causing the moving contact 85 to come in contact with the cam surface 52b of an electro-mechanical impact detecting device according to the present invention.
Figure 28:
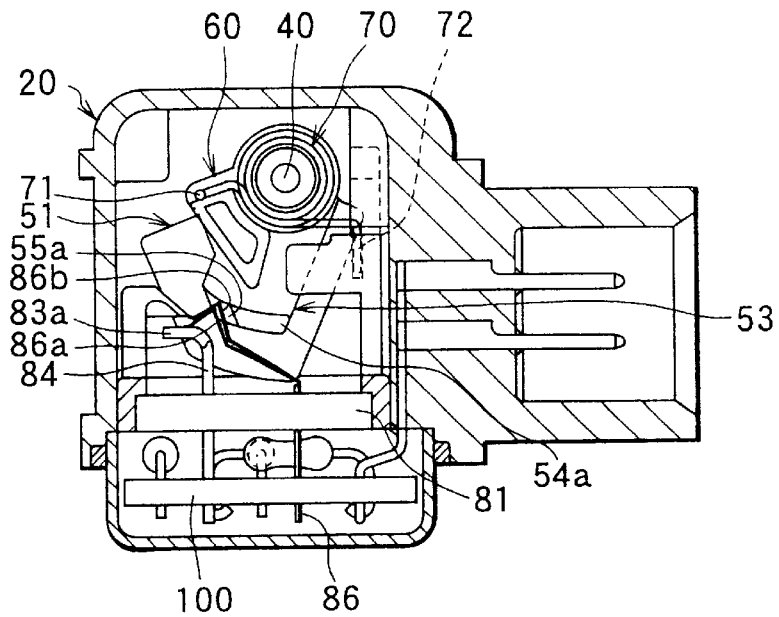
FIG. 28 is a diagram showing the state of contact of the moving contact 86a with the fixed contact 83 of an electro-mechanical impact detecting device according to the present invention.

When the main rotor 50 further rotates in the same direction, the cam section 55 abuts the moving contact section 86a, causing the moving contact section 86a to deviate in position. When the main rotor 50 further rotates in the same direction, moving contact section 86a contacts the tip section 83a of the fixed contact 83 (refer to FIG. 27). When the main rotor 50 further rotates in the same direction, the moving contact section 86a increases the contact force to the tip section 83a of the fixed contact 83. When the main rotor 50 further rotates by a certain amount, the moving contact section 86a of the moving contact 86 contacts the cam surface 52a of the cam section 55) (refer to FIG. 28). This is as effective as transitioning from contacting the moving contact 85 with the cam surface 52a to contacting the cam surface 52b.

Figure 29:
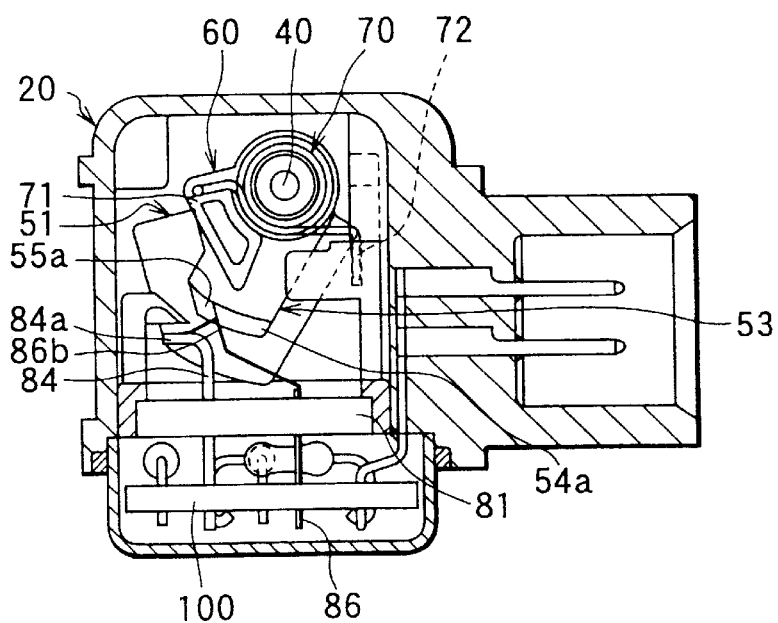
FIG. 29 is a diagram showing the contact of the moving contact 86b with the fixed contact 84 of an electro-mechanical impact detecting device according to the present invention.

When the main rotor 50 further rotates in the same direction, the cam section 54 abuts against the moving contact section 86b of the moving contact 86, causing the moving contact section 86b to deviate. When the main rotor 50 further rotates in the same direction, the moving contact 86 contacts, at its moving contact section 86b, with the tip section 84a of the fixed contact 84 (refer to FIG. 29).

Figure 30:
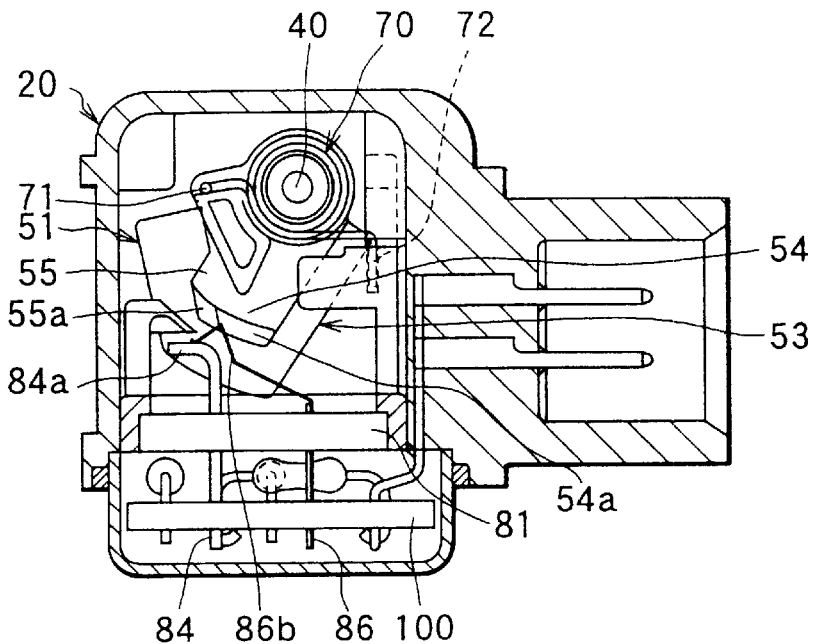
FIG. 30 is a diagram showing the state when the moving contact 86b becomes in contact with the cam surface 54a of an electro-mechanical impact detecting device according to the present invention.
Figure 31:
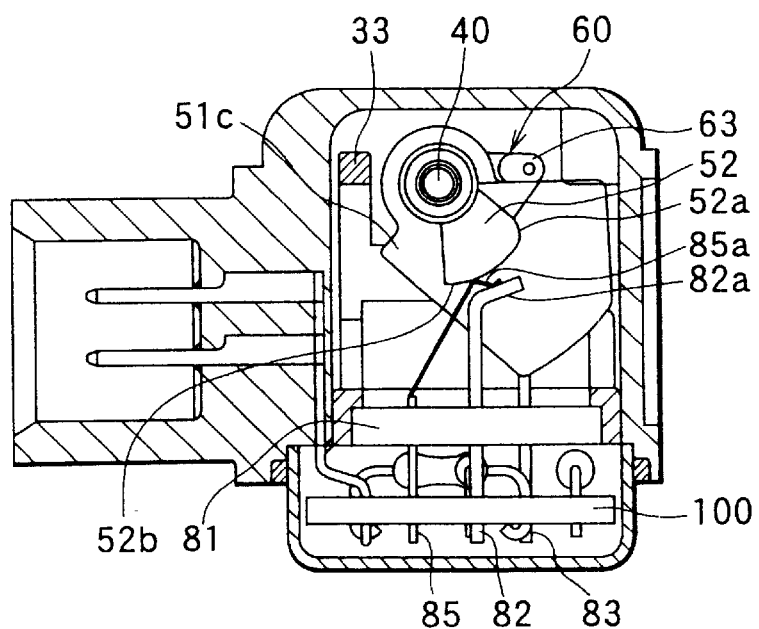
FIG. 31 is a diagram showing the state of the cam 52 and moving contact 85 when the moving contact 86b becomes in contact with the cam surface 54a of an electro-mechanical impact detecting device according to the present invention.
Figure 32:
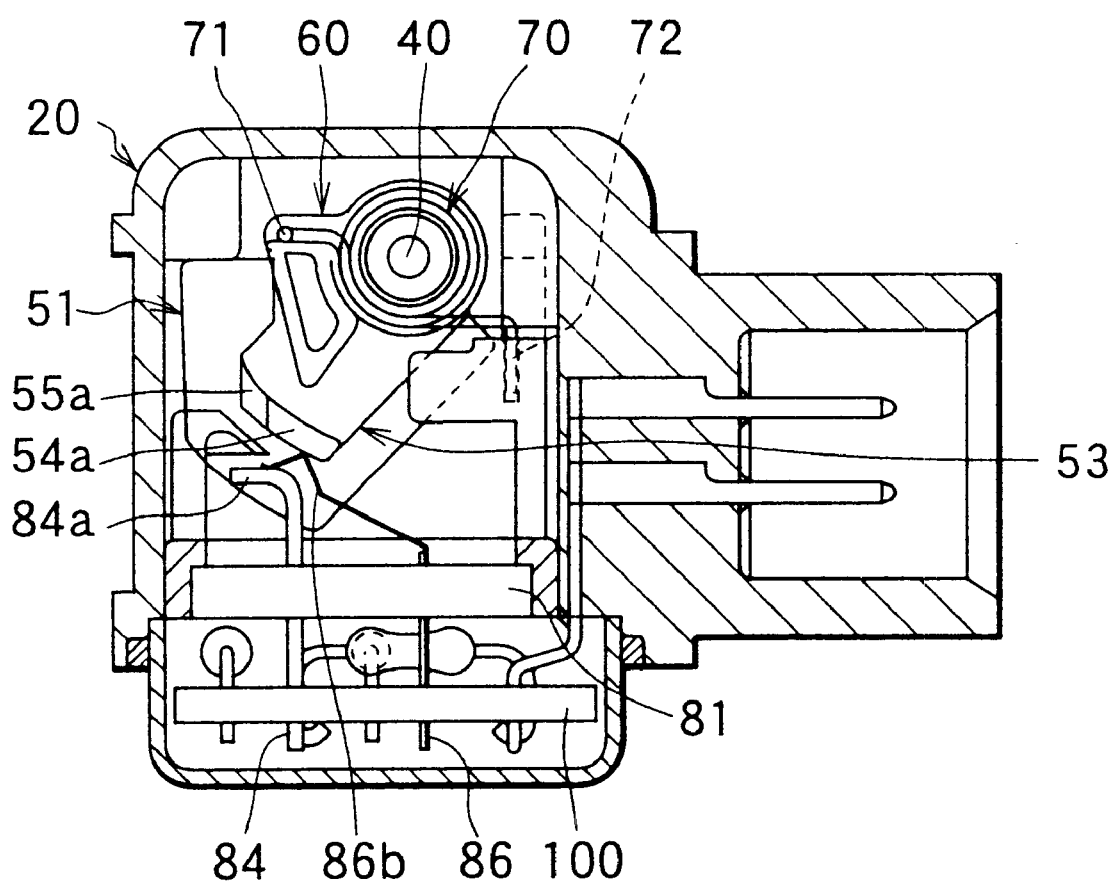
FIG. 32 is a diagram showing the state when the moving contact 86b has come in contact with the cam surface 54a of an electro-mechanical impact detecting device according to the present invention.

When the main rotor 50 further rotates in the same direction, the contact pressure of the moving contact section 86b against the tip section 84a of the fixed contact 84 increases. When the main rotor 50 further rotates in the same direction, the moving contact 86 contacts, at its moving contact section 86b, the cam surface 54a of the cam section 54 (refer to FIG. 30 through FIG. 32). This is as effective as transitioning from contacting the moving contact 85 with the cam surface 52a to contacting the cam surface 52b.

Figure 33:
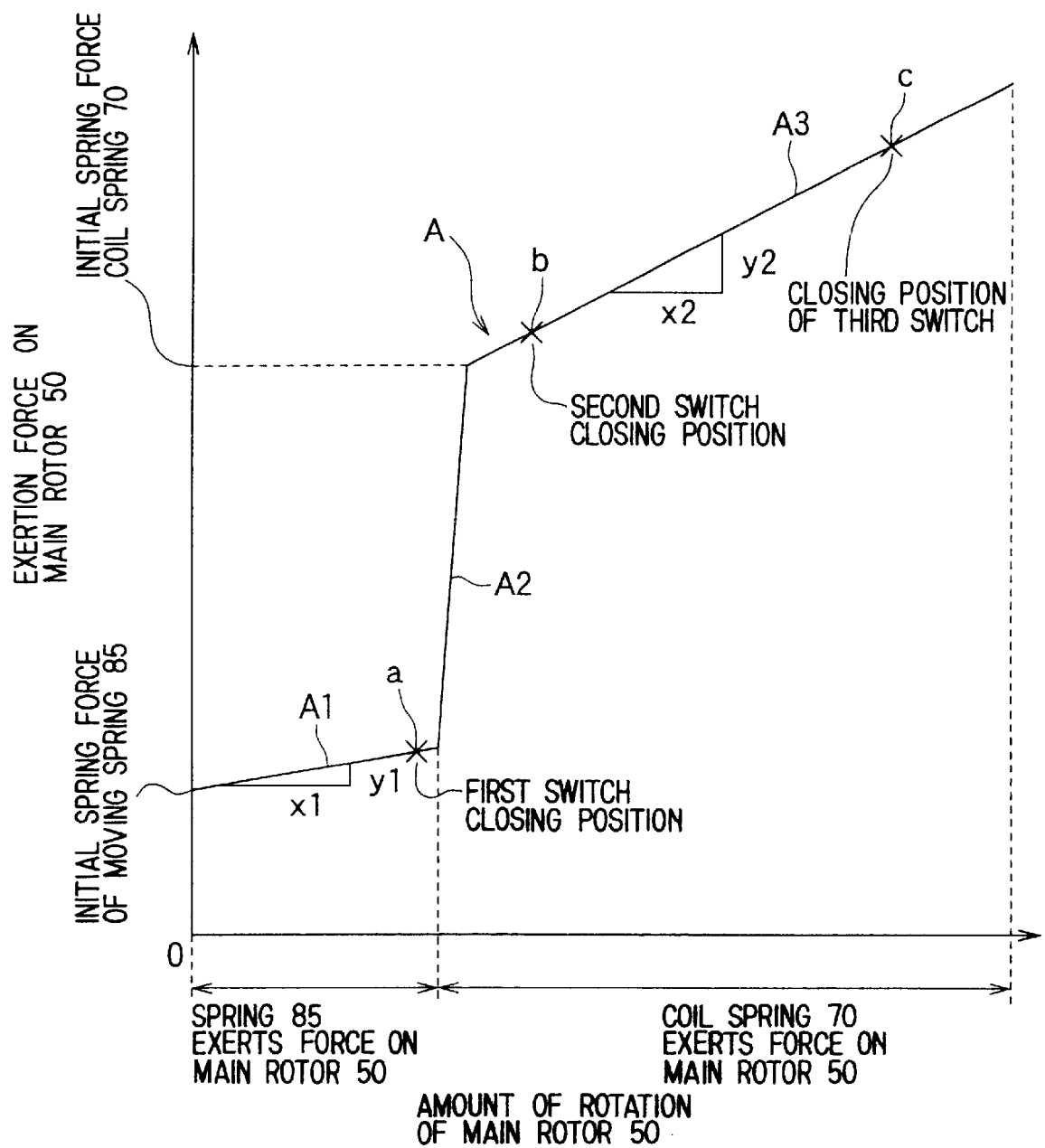
FIG. 33 is a graph showing the relation between the exertion force acting on the main rotor and the rotation value of the main rotor based on the first embodiment, with the closing of the first through third switches (first through third impact levels) being plotted as parameter of an electro-mechanical impact detecting device according to the present invention.

The foregoing is summarized in terms of relation A between the exertion force acting on the main rotor 50 and the rotation value of the main rotor 50 as shown in FIG. 33. In the figure, gradient y1/x1 indicates the spring constant of the moving contact 85, and y2/x2 indicates the spring constant of the torsional coil spring 70 which is greater than y1/x1. Symbol a indicates the closing position of the first switch (moving contact 85 contacting the fixed contact 82), symbol b indicates the closing position of the second switch (moving contact section 86a contacting the fixed contact 83), and symbol c indicates the closing position of the third switch (moving contact section 86b contacting the fixed contact 84).

FIG. 33 reveals that where the moving contact 85 exerts a force on the main rotor 50 out of the whole rotation range of the main rotor 50, the exertion force of the moving contact 85 acting on the main rotor 50 increases along line Al proportional to the rotation value of the main rotor 50 at a rate of the spring constant y1/x1. At position a immediately before the torsional coil spring 70 begins to exert a force on the main rotor 50, the flat-spring switch is closed. This closing position coincides with the first impact level detected by the impact detecting device.

The exertion force on the main rotor 50 increases sharply along line A2 up to the initial exertion force of the torsional coil spring 70. Thereafter, it increases along line A3 at a rate of the spring constant y2/x2 as the main rotor 50 rotates. At rotation positions b and c while increasing force along the line A3, the second and third switches are closed sequentially. Among these closing positions, the closing position b of the second switch coincides with the second impact level to be detected by the impact detecting device, and the closing position c of the third switch coincides with the third impact level to be detected by the impact detecting device.

Since the torsional coil spring 70 has one end section 71 inserted into the stop hole section 63a of the arm section 63 of the sub rotor 60 and another end inserted into the stop hole section 34a of the casing 30, as described above, the arm 71 of the torsional coil spring 70 is untwisted at the rotation of the main rotor 50, whereby the operational fluctuation of the impact detecting device is reduced.

Since the first through third switches are connected to the resistors R1 through R3 as described above and shown in FIG. 20, the composite resistance R decreases in steps as the impact level varies from the first through third levels as shown in FIG. 21. Accordingly, by utilizing this change of composite resistance R, impact detection for the colliding vehicle can be done in three steps (or four steps inclusive of the off state).

Figure 34:
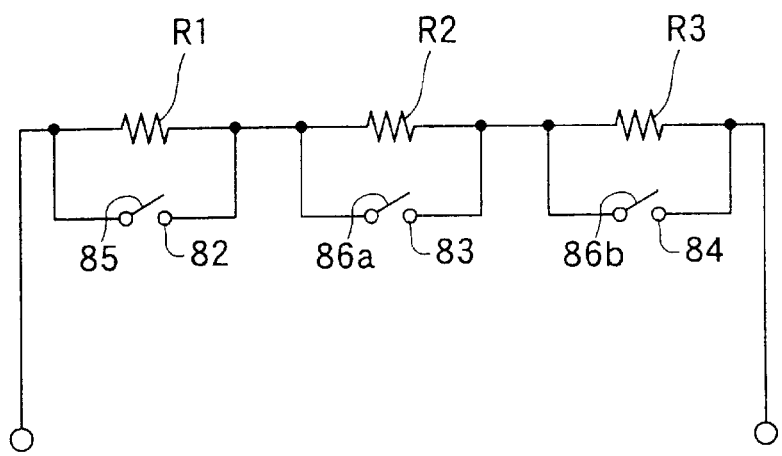
FIG. 34 is a schematic circuit diagram of the conventional circuit arrangement used to explain the advantage of the circuit arrangement of FIG. 20 of an electro-mechanical impact detecting device according to the present invention.
Figure 35:
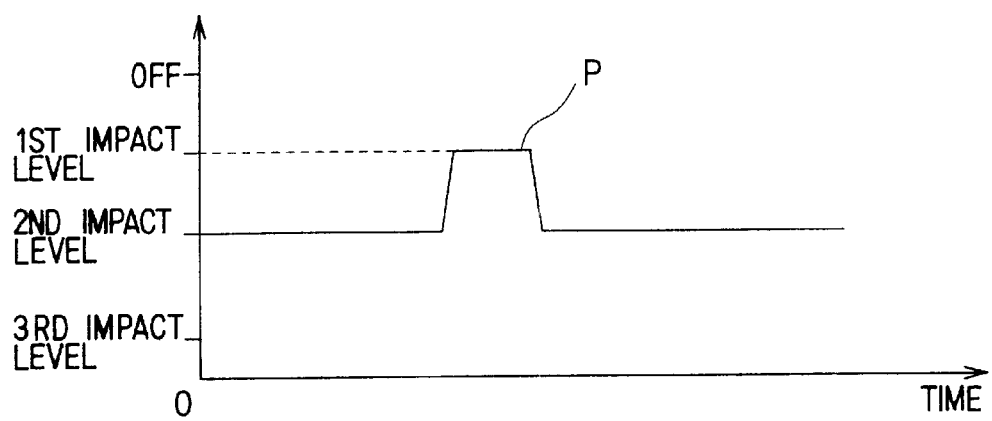
FIG. 35 is a graph showing the variation in time of the impact detecting level for explaining the problem of the circuit arrangement of FIG. 34 of an electro-mechanical impact detecting device according to the present invention.

For the first through third switches connected to the resistors R1 through R3 as shown in FIG. 34, if for example the first switch opens for some reason during operation of the impact detecting device at the second impact level, the signal at the resistance of the first impact level is released as shown by symbol P in FIG. 35, and it can be a cause of erroneous detection.

Figure 20:
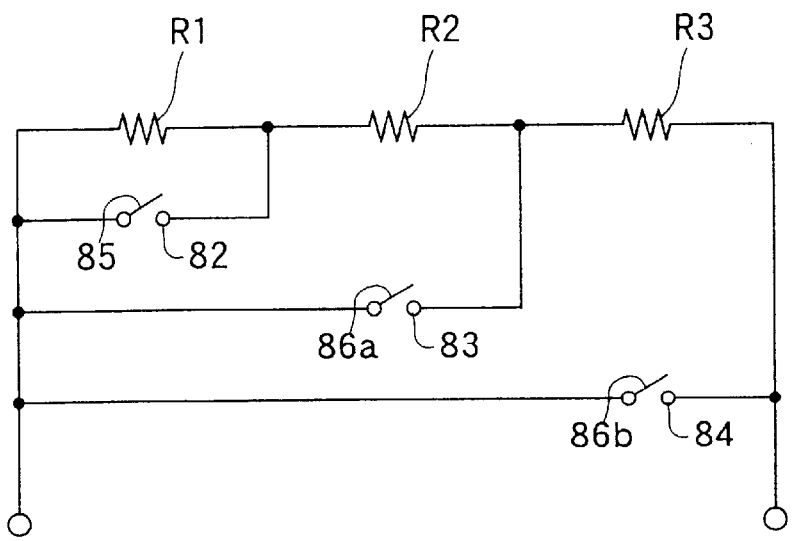
FIG. 20 is a schematic circuit diagram of the moving contacts and fixed contacts (first through third switches) and the resistors of an electro-mechanical impact detecting device according to the present invention.
Figure 36:
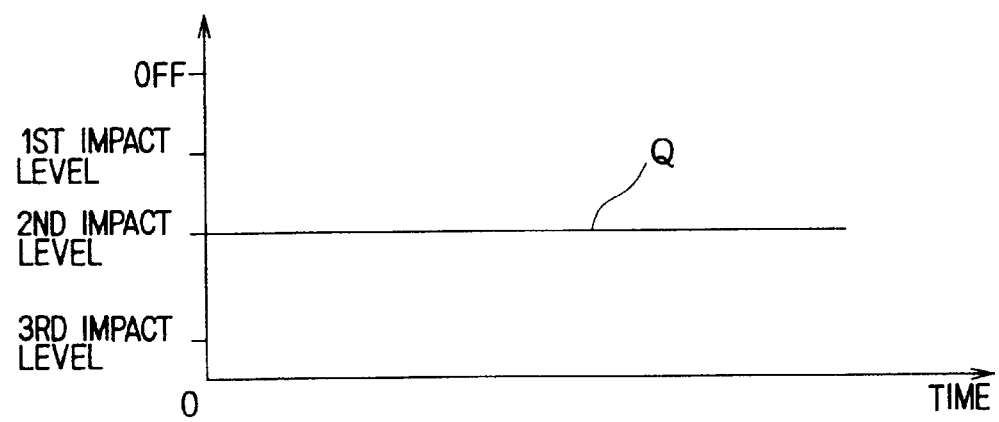
FIG. 36 is a graph showing the variation in time of the impact detecting level for explaining the advantage of the circuit arrangement of FIG. 20 of an electro-mechanical impact detecting device according to the present invention.
Figure 37:
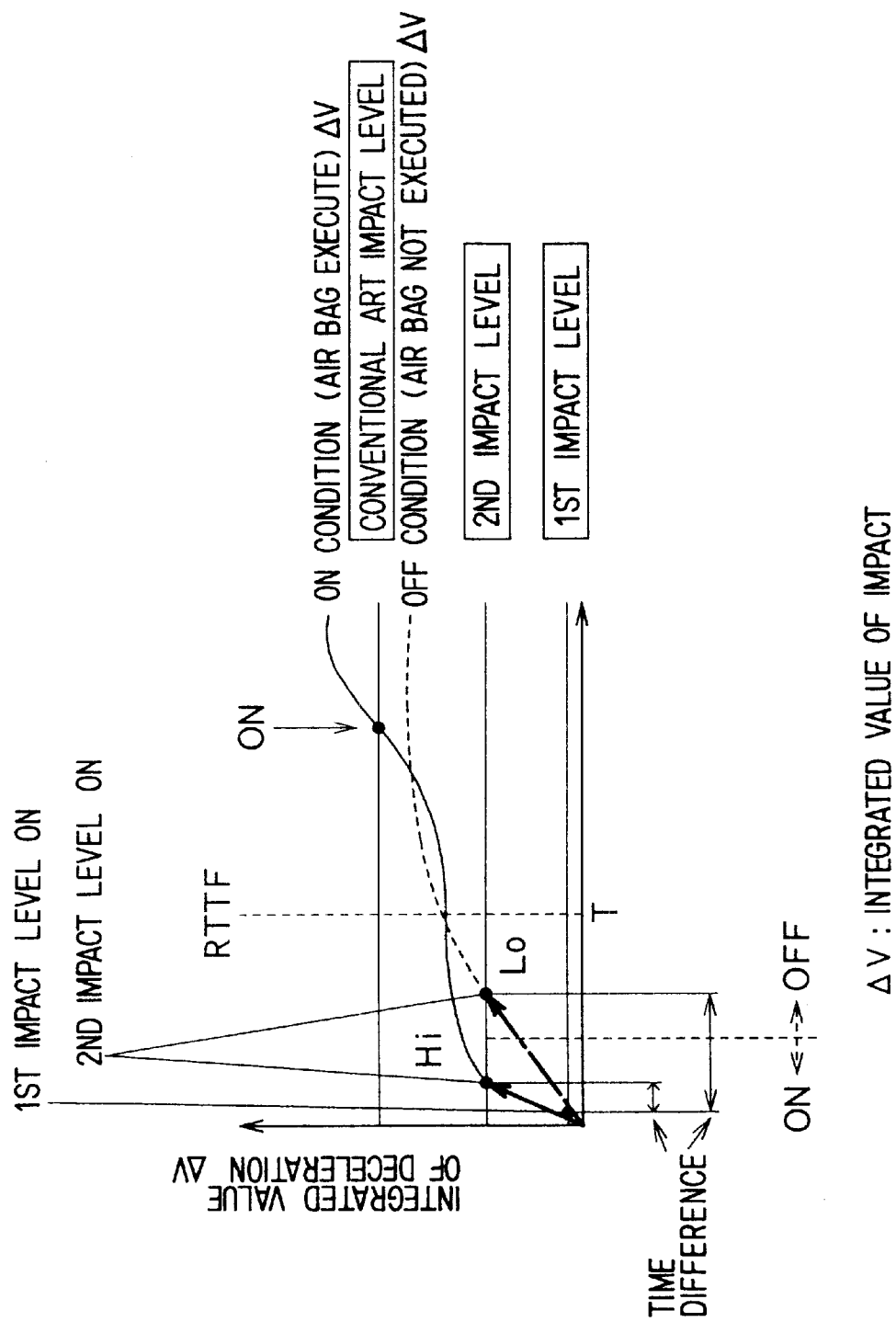
FIG. 37 is a graph used to explain the advantage of the inventive impact detecting device in contrast to the conventional impact detecting device of an electro-mechanical impact detecting device according to the present invention.

In contrast, based on the connection as shown in FIG. 20, even if the first switch opens by some reason during the operation of the impact detecting device at the second impact level, the signal is released at the resistance of the second impact level, and erroneous detection does not take place (refer to symbol Q in FIG. 36).

Figure 38:
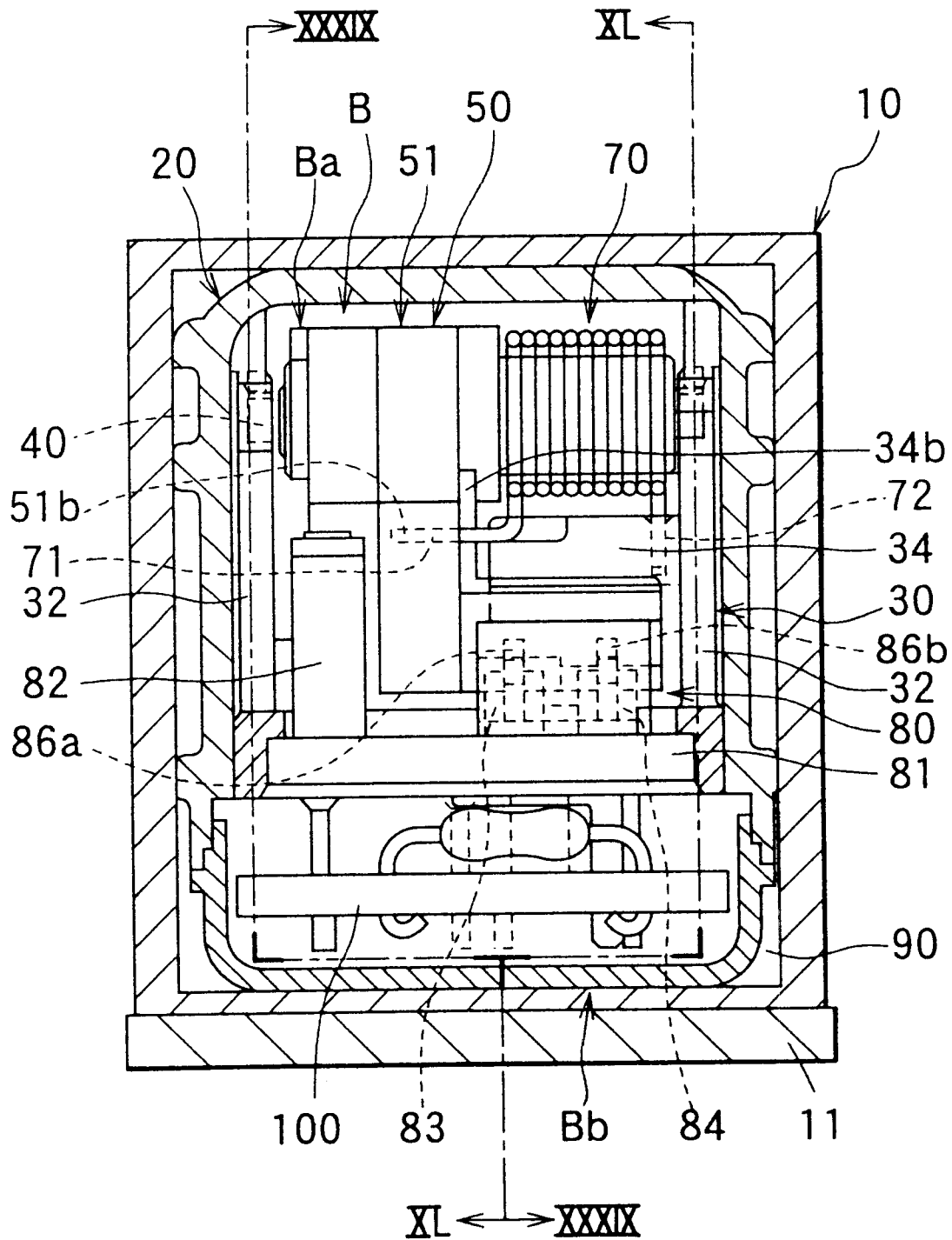
FIG. 38 is a diagram taken along the line 38—38 of FIG. 40 of an electro-mechanical impact detecting device according to the present invention.
Figure 39:
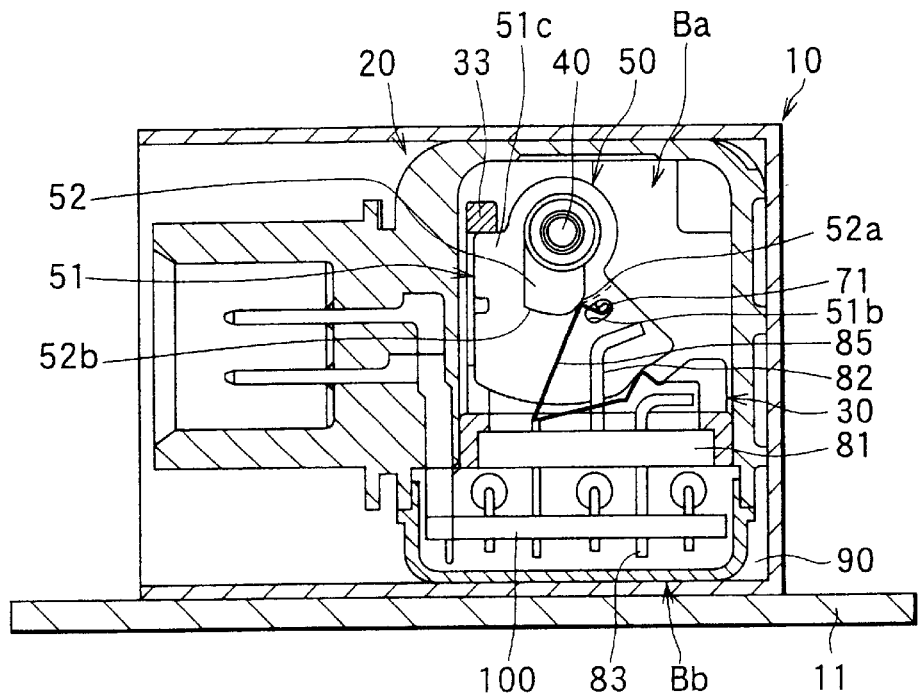
FIG. 39 is a diagram taken along the line 39—39 of FIG. 38 of an electro-mechanical impact detecting device according to the present invention.
Figure 40:
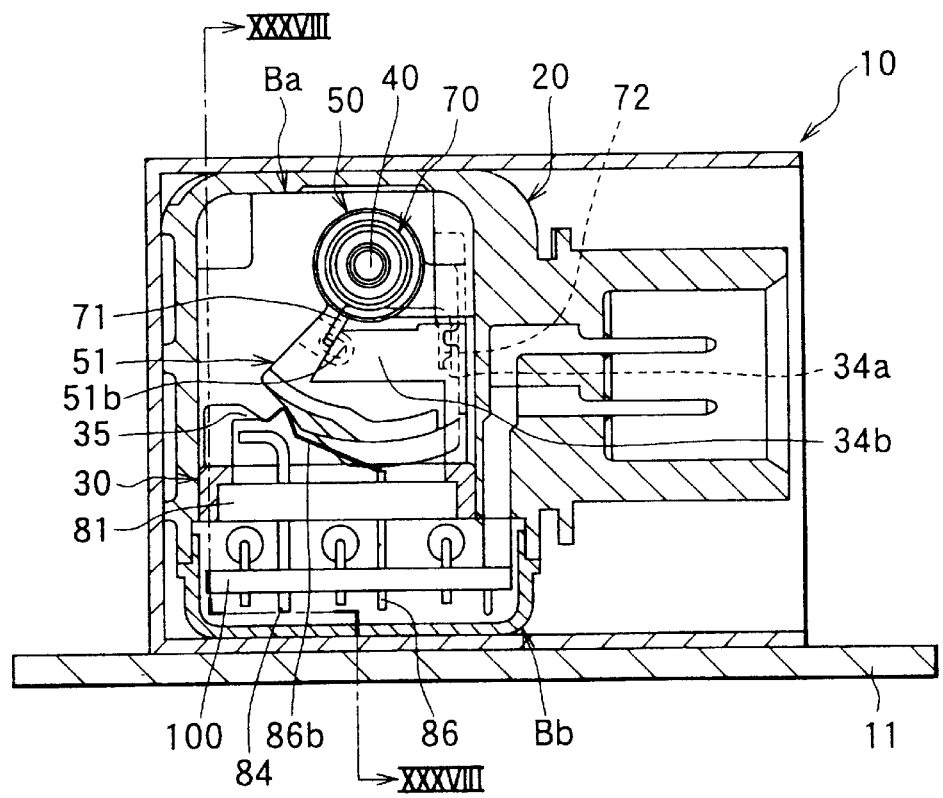
FIG. 40 is a diagram taken along the line 40—40 of FIG. 38 of an electro-mechanical impact detecting device according to the present invention.

Next, a second embodiment of the present invention will be explained with reference to FIG. 38 through FIG. 40. In the second embodiment, the sub rotor 60 described in the first embodiment is eliminated, and the material is changed and the wire diameter is increased for the torsional coil spring 70 so that the operational fluctuation of the impact detecting device caused by the twist at the end of the torsional coil spring 70 during the rotation of the main rotor 50 is reduced based on the rigidity of the torsional coil spring 70 itself.

The torsional coil spring 70 has one end 71 inserted into a long hole section 51b which is formed in the arcuate direction in the weight 51 of the main rotor 50, in place of the sub rotor 60 described in the first embodiment, and the end 71 of the torsional coil spring 70 abuts at (in FIG. 40) at its rightward root section against the stopper 34b of the casing 30.

Consequently, as main rotor 50 rotates by a certain amount, the end 71 of the torsional coil spring 70 abuts against one rotation end of the interior of the long hole section 51b. The torsional coil spring 70 has another end 72 stopped by the stop hole section 34a of the casing 30 in the same manner as the first embodiment. The torsional coil spring 70 is stopped as mentioned above by having an exertion force produced by a certain twist angle. The remaining structure is virtually identical to the first embodiment.

In the second embodiment arranged as described above, when the vehicle undergoes a certain deceleration, the main rotor 50 rotates, causing the moving contact 85 to contact the fixed contact 82 and thus increases the contact force on the fixed contact 82 in the same manner as the first embodiment. When the main rotor 50 further rotates in the same direction by a certain amount, the long hole section 51b of the weight 51 contacts, at part of its interior surface, with the one end 71 of the torsional coil spring 70.

When the main rotor 50 further rotates in the same direction, the main rotor 50 is subjected to an exertion force of the torsional coil spring 70. During this time, the torsional coil spring 70, which has a high rigidity due to an increased wire diameter or the like, does not have twisting in its end section 71 during elastic deformation from pushing by main rotor 50. Accordingly, the post-operational fluctuation of the impact detecting device can be suppressed. Referring to FIG. 41 through FIG. 44, the impact detecting device of a third embodiment has an outer housing 100 and an inner housing 110 as shown in FIG. 41 through FIG. 44. Housing 100 is fixed to the vehicle body at its proper location by a bracket 101 that is attached to the lower wall of the housing.

Figure 41:
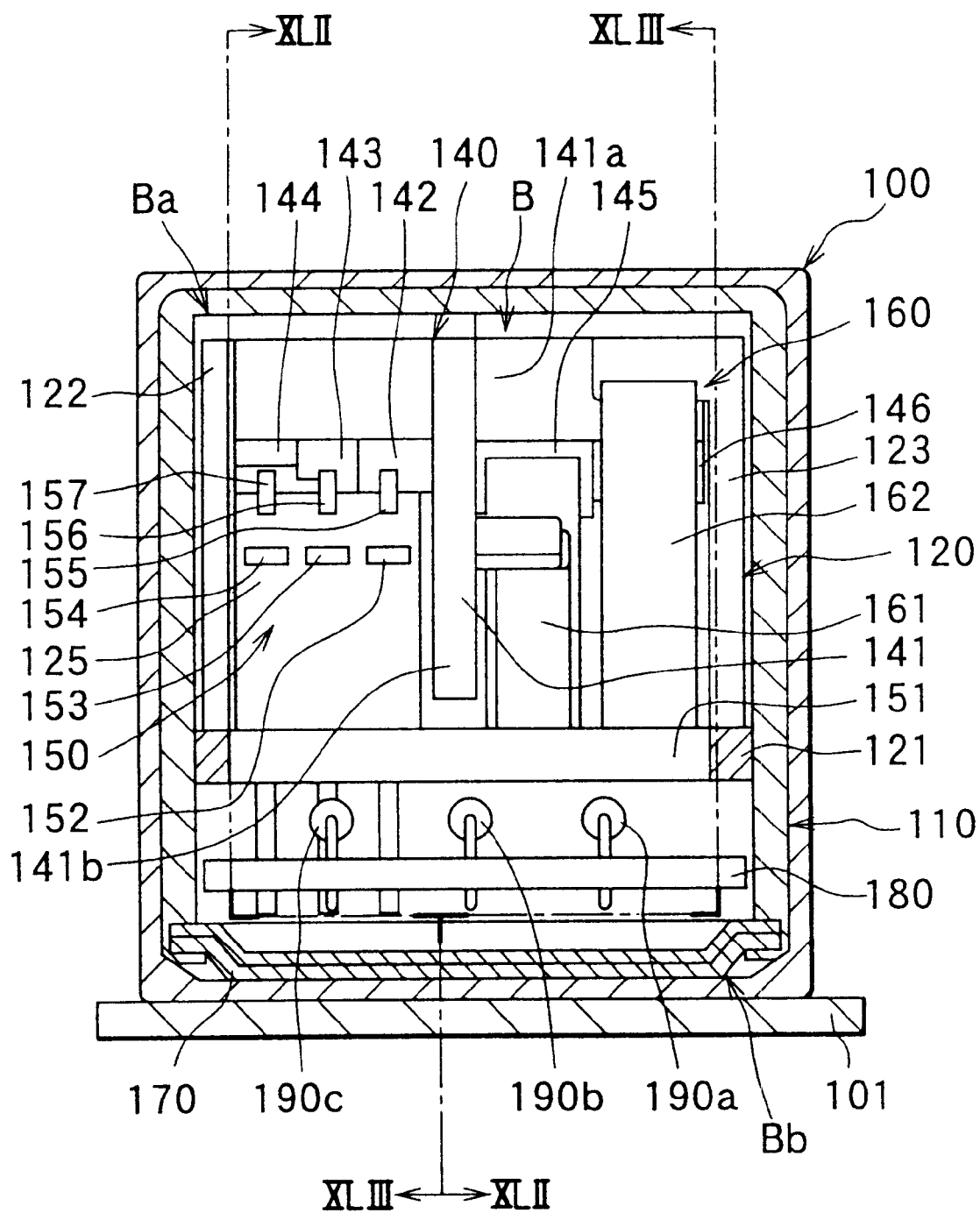
FIG. 41 is a diagram taken along the line 41—41 of FIG. 43 of the third embodiment of this invention of an electro-mechanical impact detecting device according to the present invention.
Figure 42:
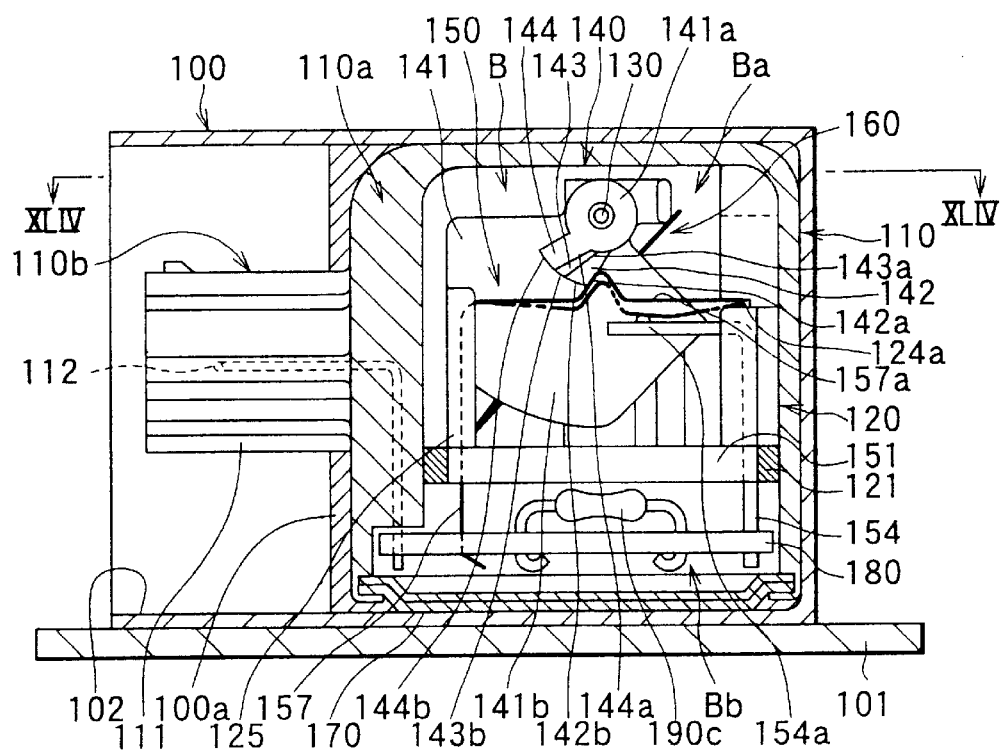
FIG. 42 is a diagram taken along the line 42—42 of FIG. 41 of an electro-mechanical impact detecting device according to the present invention.
Figure 43:
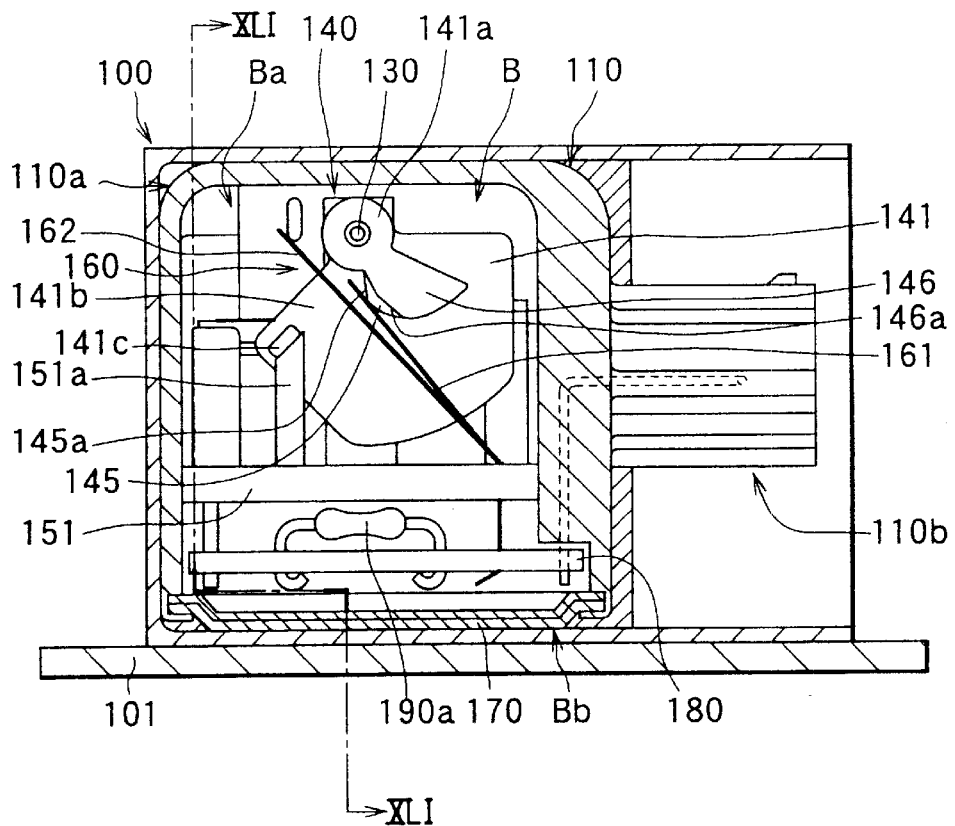
FIG. 43 is a diagram taken along the line 43—43 of FIG. 41 of an electro-mechanical impact detecting device according to the present invention.
Figure 44:
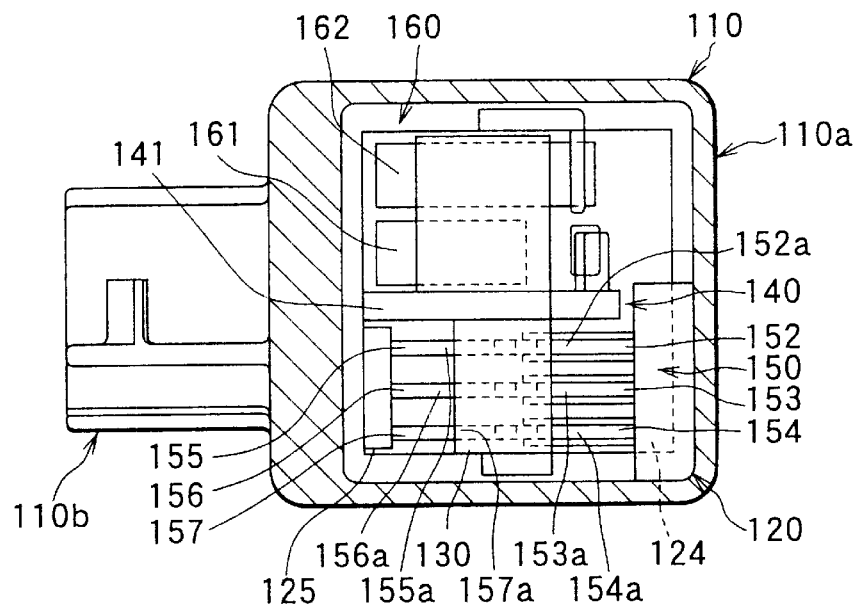
FIG. 44 is a diagram taken along the line 44—44 of FIG. 42 of an electro-mechanical impact detecting device according to the present invention.
Figure 45:
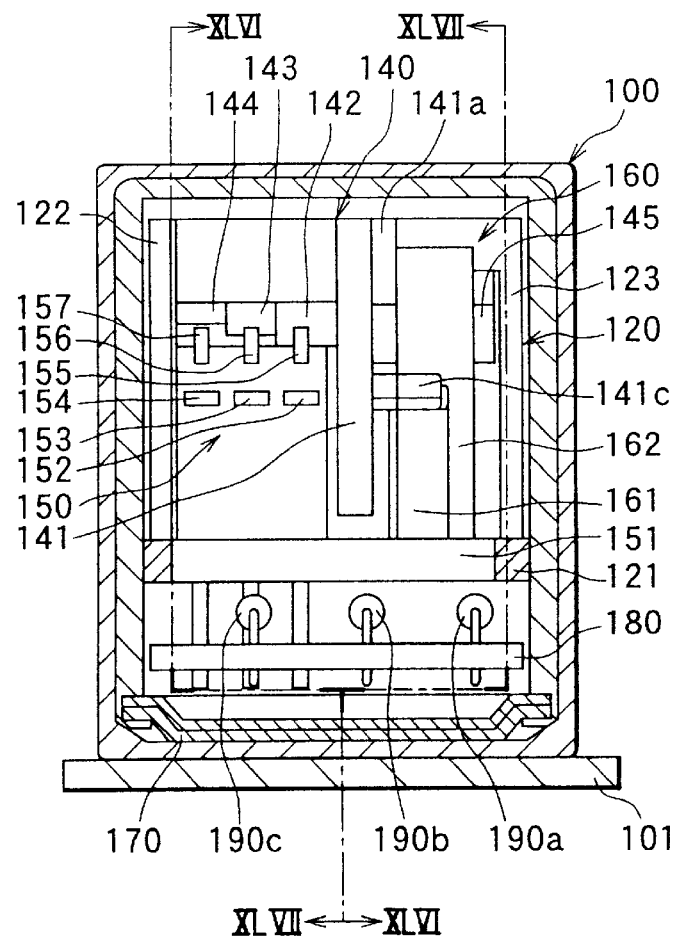
FIG. 45 is a diagram taken along the line 45—45 of FIG. 47 of the fourth embodiment of this invention of an electro-mechanical impact detecting device according to the present invention.
Figure 46:
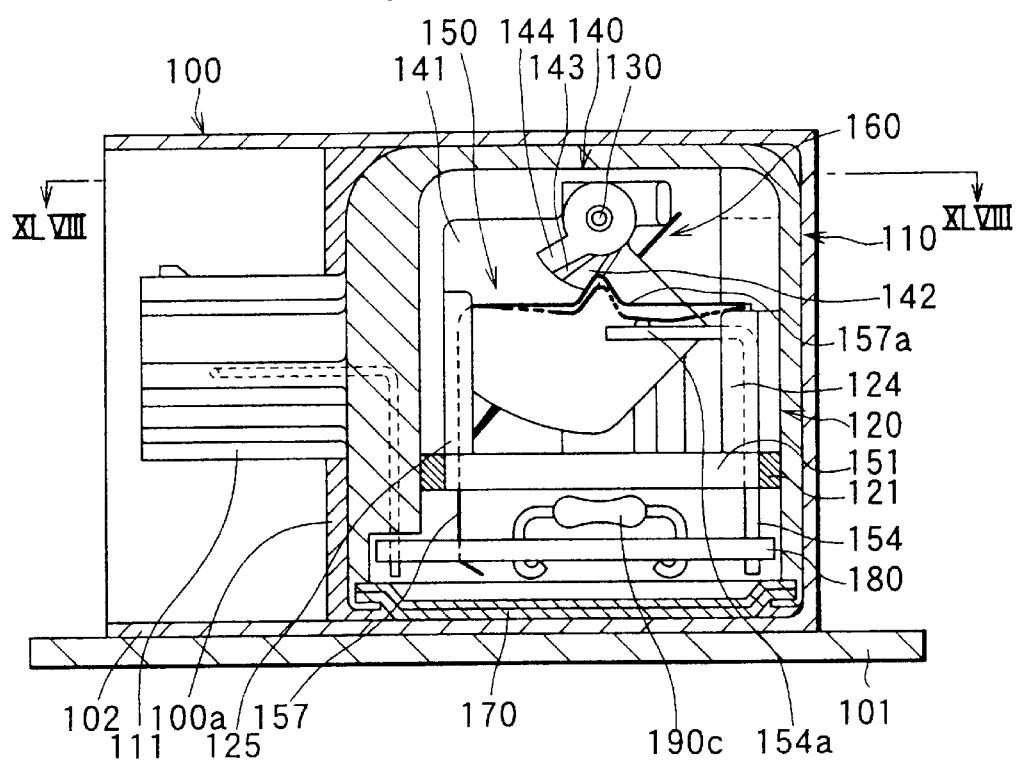
FIG. 46 is a diagram taken along the line 46—46 of FIG. 45 of an electro-mechanical impact detecting device according to the present invention.

The inner housing 110 is fitted in the outer housing 100 as shown in FIG. 41 through FIG. 43. The housing 110 has a connector 110b that extends from and is integral with housing section 110a. The housing section 110a is located on the bottom of the housing 100 and the connector 110b is located in the opening section of the housing 100. The connector 110b confronts the outside at its connecting section 111 through an opening 102 of the housing 100. In FIG. 42, terminals 112 of the connector 110b are shown.

This impact detecting device has a device main body B, which is fitted in both housings 100 and 110 as shown in FIG. 41 through FIG. 43. The device main body B includes a mechanical section Ba and an electrical circuit section Bb. The mechanical section Ba is fitted in the housing section 110a of the inner housing 110, and the electrical circuit section Bb is fitted in the housing 100 on the lower wall of the housing section 110a. The mechanical section Ba includes a casing 120, a rotation shaft 130, a rotor 140, a contact mechanism 150, and a flat-spring mechanism 160. The casing 120 is fitted in the housing section 110a. The casing 120 is made of a electrically insulating synthetic resin. This casing is shaped as shown in FIG. 41 through FIG. 44, and is seated by being coupled at its rectangular annular root section 121 downward in FIG. 41 and FIG. 42 onto a base 151 of the contact mechanism 150 (will be explained later).

The rotation shaft 130 has both ends pivotally mounted between the top sections of the support columns 122 and 123 of the casing 120. The rotor 140 is coupled concentrically with rotation shaft 130, and the rotor 140 has plate weight 141, contact cams 142 through 144, and exerting cams 145 and 146 integrally formed.

The weight 51 is plate shaped such that the weight center is eccentric from the rotation center (FIG. 42 and FIG. 43. Specifically, the weight 141 has a cylindrical boss 141a located at the rotation center, and a weight section 141b which causes the weight center to be eccentric from the boss 141a. The weight 141 is coupled concentrically to the rotation shaft 130 by means of the boss 141a, so that the weight section 141b is located below the rotation shaft 130. Accordingly, the weight 141 initially abuts obliquely from the top-left side at a protruding section 141c of the weight section 141b against the tip slant surface (refer to FIG. 43) of a stopper 151a of the base 151. The stopper 151a works for the initial stopper of the weight 141.

The contact cams 142 through 144 extend along the left-side plane of the weight 141 downward to the circumferential plane of the left-side section in FIG. 41 of the boss 141a (refer to FIG. 42). These contact cams 142 through 144 are located by being more distant in this order from the left-side plane in FIG. 41 of the weight 141. The contact cam 142 has two cam surfaces 142a and 142b, the contact cam 143 has two cam surfaces 143a and 143b, and the contact cam 144 has two cam surfaces 144a and 144b. The cam surfaces 142a, 143a and 144a are located to shift sequentially to the left in FIG. 42, and the cam surfaces 142b, 143b and 144b have a same arcuate profile centered by the axis of the rotation shaft 130.

The exerting cams 145 and 146 extend along the right-side plane of weight 141, downward to the circumferential surface on the right in FIG. 41 of the boss 141a (refer to FIG. 43). These exerting cams 145 and 146 are more distant in this order from the right-side plane in FIG. 41 of the weight 141. The exerting cams 145 and 146 have cam surfaces 145a and 146a, respectively, which face to the left in FIG. 43, with the cam surface 145a shifting in position to the left more than the cam surface 146a.

The contact mechanism 150 has a base 151 as shown in FIG. 41 through FIG. 43. The base 151 is fixed into the rectangular annular root section 121 as mentioned previously. The contact mechanism 150 has fixed contacts 152, 153 and 154 formed of elongate plates and moving contacts 155, 156 and 157 formed of elongate plates as shown in FIG. 41 through FIG. 44.

The fixed contact 152 in unison with the moving contact 155 constitutes the above-mentioned first switch, the fixed contact 153 in unison with the moving contact 156 constitutes the above-mentioned second switch, and the fixed contact 154 in unison with the moving contact 157 constitutes the above-mentioned third switch. The fixed contacts 152, 153 and 154 in parallel alignment are fed through the right-side wall 124 in FIG. 42 and FIG. 43 of the causing 120 and fixed into base 151. These fixed contacts 152, 153 and 154 have their contact sections 152a, 153a and 154a extending in an L-shape fashion from the upper end of the right-side wall to the left. The moving contacts 155, 156 and 157 in parallel alignment are fed through the left-side wall 125 in FIG. 42 of the base 151 and fixed into the base 151. These moving contacts 155, 156 and 157 have their contact sections 155a, 156a and 157a extending in an L-shape fashion from the upper end of the left-side wall, thereby confronting the fixed contacts 152, 153 and 154.

The contact sections 155a, 156a and 157a extend along the upper face (refer to FIG. 42) of the contact sections 152a, 153a and 154a and have their tip section stopped in a preload stopper 124a which is located immediately above the right-side wall of the base 151. Thus, they are subjected to a predetermined downward loading in advance.

The moving contacts 155, 156 and 157 have their contact sections 155a, 156a and 157a located immediately below the contact cams 142 through 144 of the rotor 140. These contact sections 155a, 156a and 157a are pushed at their L-shaped protruding sections (refer to FIG. 42) by the cam surface of the contact cams 142 through 144 to contact the contact sections 152a, 153a and 154a of the fixed contacts 152, 153 and 154.

The flat-spring mechanism 160 has exerting flat-springs 161 and 162 as shown in FIG. 41 through FIG. 44. These springs 161 and 162 are planted at their root section on the right-side section of the base 151 as shown in FIG. 43. The exerting flat-springs 161 and 162 coming from the right-side section of the base 151 run immediately below the exerting cams 145 and 146 of the rotor 140 and extend up-rightward obliquely. As a result, the exerting flat-spring 161 is subjected to an exertion force obliquely down-leftward in FIG. 43 by the cam surface 43 of the exerting cam 145. The flat exerting spring 162 is subjected to an exertion force obliquely down-leftward in FIG. 43 by the cam surface 43 of the exerting cam 145.

The electrical circuit section Bb is provided with a dish-shaped rid 170 as shown in FIG. 41 through FIG. 43. A printed circuit board 180 is mounted in the lower opening section of the inner housing 110 and located immediately above the rid 170. Planted on the printed circuit board 180 are fixed contacts 152, 153 and 154 and moving contacts 155, 156 and 157, which are connected electrically to the wiring section of the printed circuit board 180.

The electrical circuit section Bb includes resistors 190a through 190c. These resistors 190a through 190c are connected to the wiring section of the printed circuit board 180. The resistor 190a mates with the fixed contact 152 and moving contact 155. The resistor 190b mates with the fixed contact 153 and moving contact 156. The resistor 190c mates with the fixed contact 154 and moving contact 157. The resistors 190a, 190b and 190c are equivalent to the resistors R1, R2 and R3, respectively, described in the first embodiment. The fixed contacts 152, 153 and 154 correspond to the fixed contacts 82, 83 and 84, respectively, of the first embodiment. The moving contacts 155, 156 and 157 correspond to the contact sections 86a and 86b of the moving contacts 85 and 86, respectively. To satisfy these relationships, the third embodiment has a wiring circuit arrangement as shown in FIG. 20. In FIG. 42, symbol 100a denotes hermetic filling material.

In the third embodiment, when the vehicle decelerates, the rotor 140 rotates clockwise in FIG. 43 about the axis of rotation of shaft 130. Since the exerting flat-spring 161 contacts, at its tip, the cam surface 145a of the exerting cam 145, the tip of the exerting flat-spring 161 deviates to the left in FIG. 43.

When the rotor 140 further rotates in the same direction, the surface of the contact cam 142 abuts cam surface 142a against the protruding section of the moving contact 155. This causes the contact section 155a to bend downward as shown by the double-dash line in FIG. 42. Consequently, the contact section 155a of the moving contact 155 gradually approaches the contact section 152a of the fixed contact 152. It eventually contacts the contact section 152a.

When the rotor 140 further rotates in the same direction, the force by the contact section 155a acting on the contact section 152a increases. After the rotor 140 has rotated by a certain amount, the surface of exerting cam 146 contacts the tip of flat exerting spring 162. When the rotor 140 further rotates, it will be subjected to the exertion force of the flat exerting spring 162.

When the rotor 140 further rotates by a certain amount in the same direction, the protruding section of moving contact 155 exits the cam surface 142a and contacts the cam surface 142b. Since the cam surface 142b has an arcuate profile centered by the axis of rotation of shaft 130, the downward bending displacement of the moving contact 155 following this contact transition becomes zero. Also, the moving contact 155 stays in contact with the fixed contact 152 at certain contact force. Accordingly, the force of the moving contact 155 acting on the rotor 140 resulting from the rotation of the rotor 140 is only a frictional force between the moving contact 155 and the cam surface 142b.

If the moving contact 155 continues to bend downward at its contact section 155a contacting the protruding section of the cam surface 142, the moving contact 155 would exert a force from friction between moving contact 155 and contact cam 142 and from flat springs 161 and 162 on the rotor 140.

Because of fluctuations of the second and third impact levels detected by the impact detecting device of the third embodiment, it is desirable to reduce the number of forces acting on the rotor 140. Accordingly, in this embodiment, the cam surface 142b contacting the moving contact 155 has an arcuate profile. When the rotor 140 further rotates in the same direction, the contact cam 143 abuts the protruding section of the moving contact 156, causing the contact section 156a to bend and deviate downward. When the rotor 140 further rotates by a certain amount, the moving contact 156 eventually comes in contact, at its contact section 156a, with the contact section 153a of the fixed contact 153.

When the rotor 140 further rotates in the same direction, the contact force of the contact section 156a acting on the contact section 153a of the fixed contact 153 increases. After the rotor 140 has rotated by a certain amount in the same direction, the protruding section of the moving contact 156 leaves the cam surface 143a and contacts the cam surface 143b of the contact cam 143. To reduce the number of forces acting on the rotor 140, the cam surface 143b, for similar reasons as cam surface 142b, has an arcuate profile. When the rotor 140 further rotates in the same direction, the contact cam 144 abuts the protruding section of the moving contact 157, causing the contact section 157a to bend and deviate downward. When the rotor 140 further rotates by a certain amount, the moving contact 157, at its contact section 157a, eventually contacts the contact section 154a of the fixed contact 154.

When the rotor 140 further rotates in the same direction, the contact force of contact section 157a acting on the contact section 154a increases. After the rotor 140 has rotated by a certain amount in the same direction, the protruding section of moving contact 157 leaves the cam surface 144a and contacts cam surface 144b. To reduce forces, the cam surface 144b has an arcuate profile.

In the third embodiment, when the rotor 140 is within the rotation range where it is subjected to the exertion force by flat-spring 161, the impact detecting device operates at the first impact level mentioned in the first embodiment. The device operates at the second and third impact levels mentioned in the first embodiment when the rotor 140 is within the rotation range in which it is subjected to the exertion force of the flat exerting spring 162. The rotation range of the rotor 140, the exertion force acting on the rotor 140, and the closing positions of the moving contacts and fixed contacts (closing positions of the first through third switches) at the impact levels are then identical to the case shown in FIG. 33. Also, by increasing the exertion force and spring constant of the flat exerting spring 162 relative to flat-spring 161, the first through third impact levels can be altered.

Figure 47:
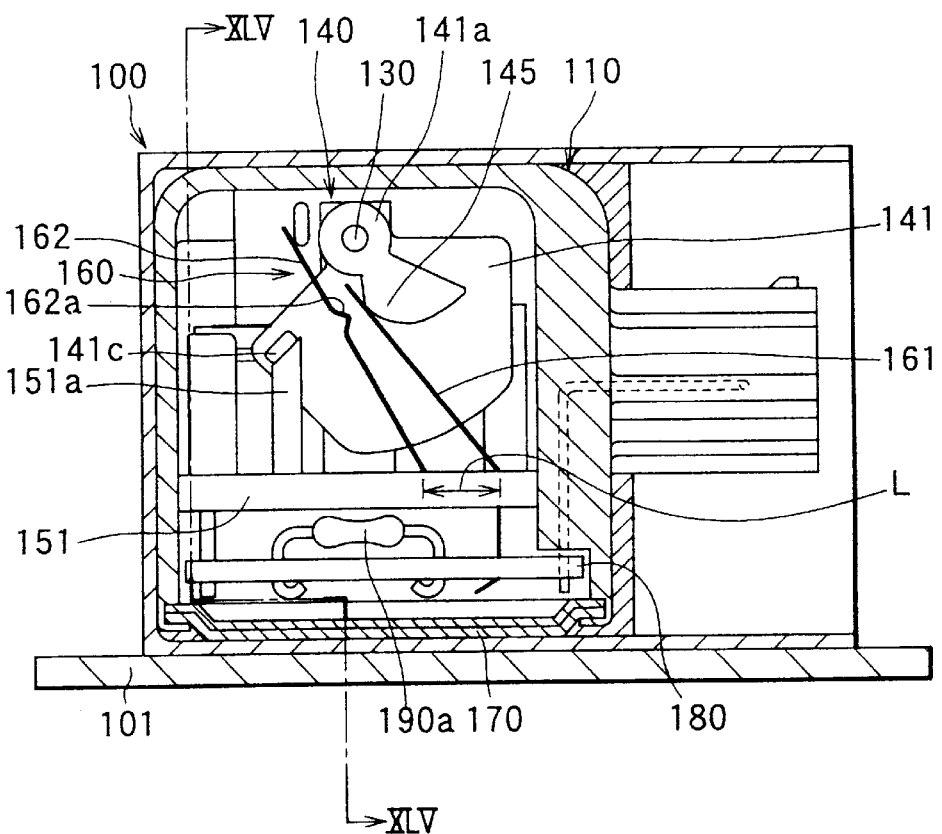
FIG. 47 is a diagram taken along the line 47—47 of FIG. 45 of an electro-mechanical impact detecting device according to the present invention.
Figure 48:
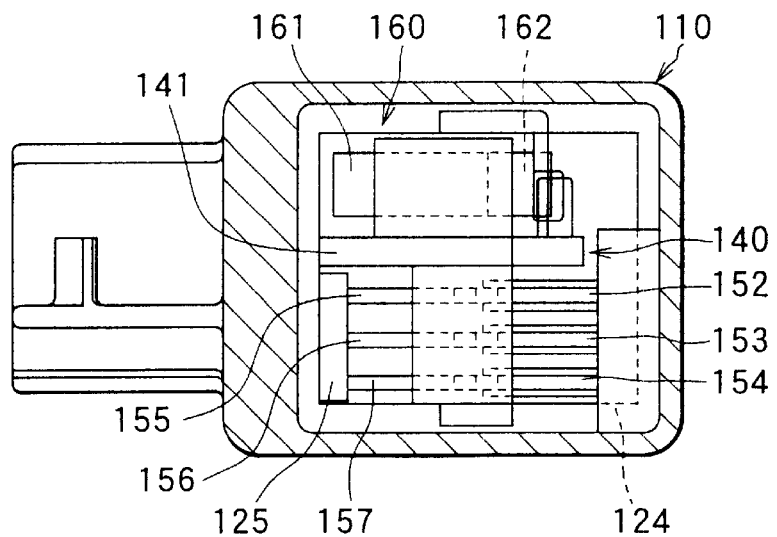
FIG. 48 is a diagram taken along the line 48—48 of FIG. 46 of an electro-mechanical impact detecting device according to the present invention.
Figure 49:
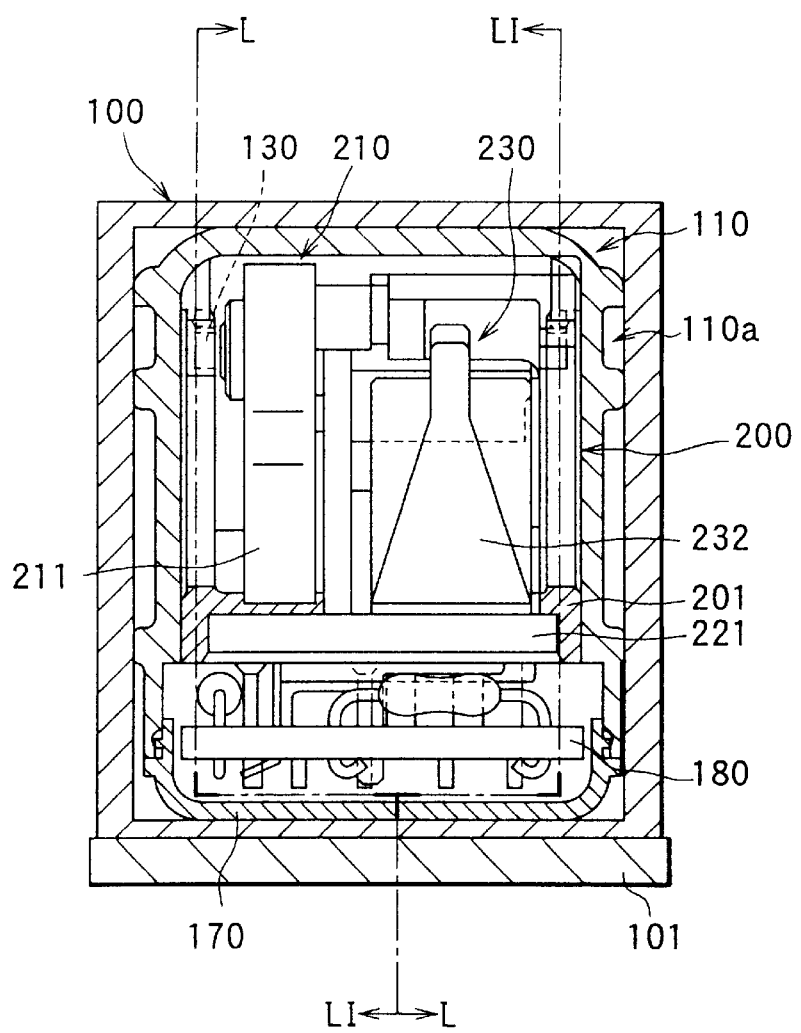
FIG. 49 is a diagram taken along the line 49—49 of FIG. 51 of the fifth embodiment of this invention of an electro-mechanical impact detecting device according to the present invention.
Figure 50:
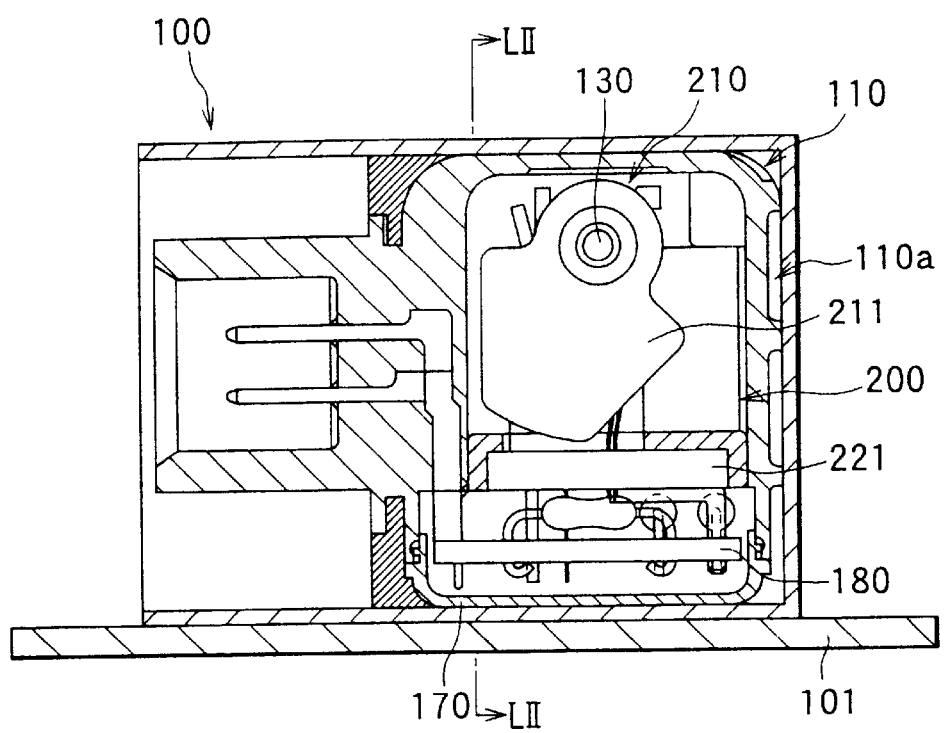
FIG. 50 is a diagram taken along the line 50—50 of FIG. 49 of an electro-mechanical impact detecting device according to the present invention.

FIG. 45 through FIG. 48 show the fourth embodiment of the impact detecting device according to the present invention. Here, the flat-spring mechanism 160, has its flat exerting spring 162 extending from the base 151 to confront the exerting flat-spring 161 on the left-side plane thereof in FIG. 47. The positions on the base 151 from which the exerting flat-springs 161 and 162 extend have a certain distance L as shown in FIG. 47. The flat exerting spring 162 has a V-shaped protruding section 162a at its mid position which points to the tip section of the exerting flat-spring 161. Because of this alteration, the contact cam 146 of the rotor 140 third embodiment is eliminated. The remaining arrangement is identical to the third embodiment.

When the rotor 140 rotates in response to a certain deceleration of the vehicle, the exerting flat-spring 161 is pushed at its tip section by the exerting cam 145 to deviate to the left in FIG. 47. The rotor 140 further rotates in the same direction, causing the moving contact 155 to contact the fixed contact 152 the same as in the third embodiment. When the rotor 140 further rotates, the tip section of the exerting flat-spring 161 abuts the protruding section 162a of the flat exerting spring 162. When the rotor 140 further rotates in the same direction, the rotor 140 is subjected to the exertion forces of the two exerting flat-springs 161 and 162, to the right in FIG. 47, through the exerting cam 145. The operation of the impact detecting device in the successive rotation of the rotor 140 in the same direction is identical to the third embodiment.

Placing the flat exerting spring 162 to confront the exerting flat-spring 161 on the left-side plane thereof in FIG. 47 makes the impact detecting device compact. Specifically, placing the flat exerting spring 162 parallel to the exerting flat-spring 161, as described in the third embodiment, keeps the flat-springs 161 and 162 from contacting each other during operation. Although the impact detecting device is free from the operational fluctuation caused by the frictional force at the contact of the two springs 161 and 162, the device must have a larger lateral dimension (axial direction of the rotation shaft 130). This makes it difficult to install in a small vehicle space.

In contrast, according to the fourth embodiment, in which the flat exerting spring 162 confronts the exerting flat-spring 161 on the left-side plane thereof in FIG. 47, the two springs 161 and 162 share lateral space. Accordingly, the impact detecting device has a smaller external lateral dimension.

However, during operation, the two exerting flat-springs 161 and 162 contact each other, with the contact point moving as the rotor 140 rotates. As a result, a frictional force is generated between the two exerting flat-springs 161 and 162. This frictional force increases the operational fluctuation of the impact detecting device. Therefore, it is desirable to reduce this force to make the exertion forces and spring constants of the exerting flat-springs 161 and 162 as small as possible.

FIG. 49 through FIG. 52 show the fifth embodiment of the electro-mechanical impact detecting device based on this invention. The fifth embodiment employs a casing 200, a rotor 210, a contact mechanism 220 and a flat-spring mechanism 230. Casing 200, which replaces casing 120, is fitted in the housing section 110a described in the fourth embodiment. The rotor 210, which replaces the rotor 140, is coupled concentrically to the rotation shaft 130. The rotor 210 has a integral formation of a plate weight 211, contact cams 212 through 214 and an exerting cam 215 which corresponds to the plate weight 141, contact cams 142 through 144 and exerting cam 145 of the rotor 140. The weight 211, contact cams 212 through 214 and exerting cam 215 have virtually the same functions as of the weight 141, contact cams 142 through 144 and exerting cam 145.

Figure 51:
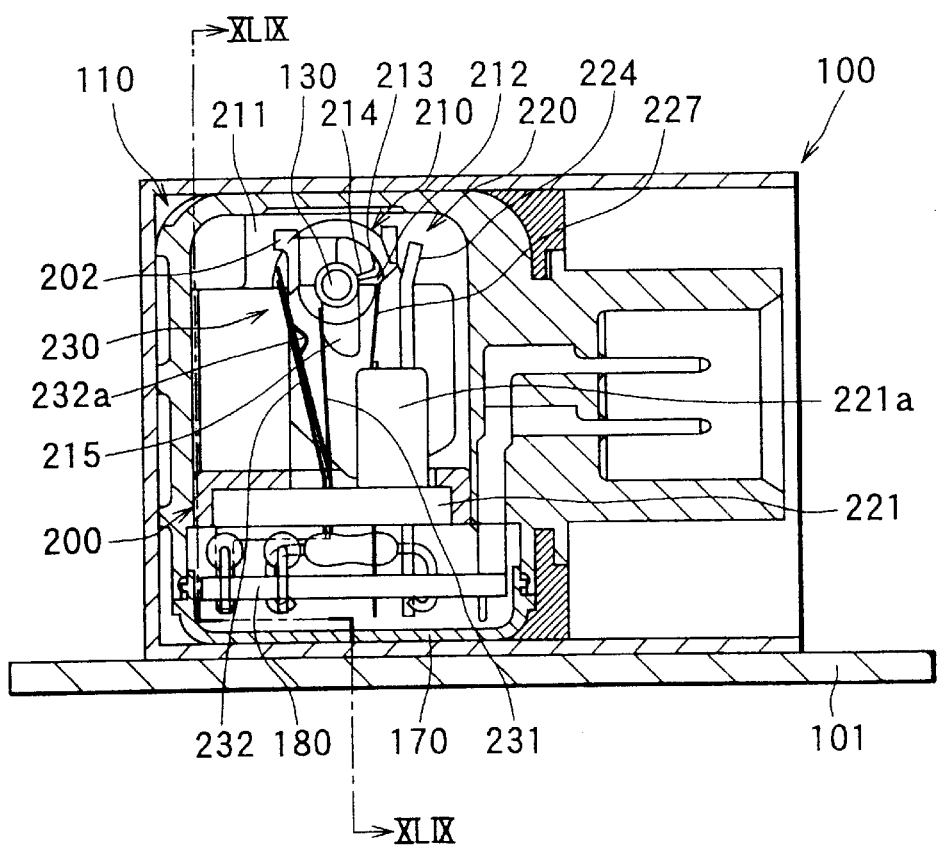
FIG. 51 is a diagram taken along the line 51—51 of FIG. 49 of an electro-mechanical impact detecting device according to the present invention.
Figure 52:
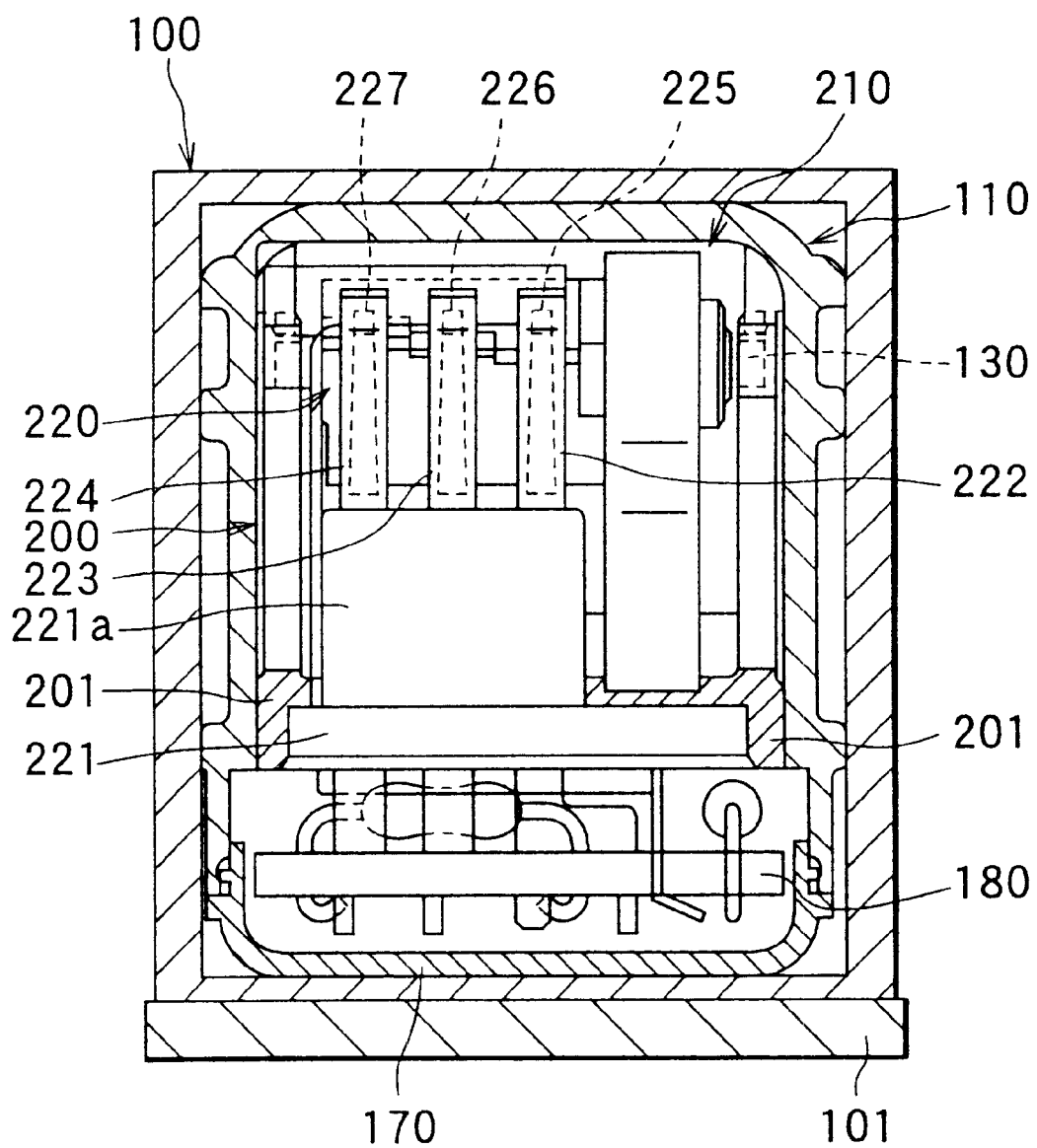
FIG. 52 is a diagram taken along the line 52—52 of FIG. 50 of an electro-mechanical impact detecting device according to the present invention.
Figure 53:
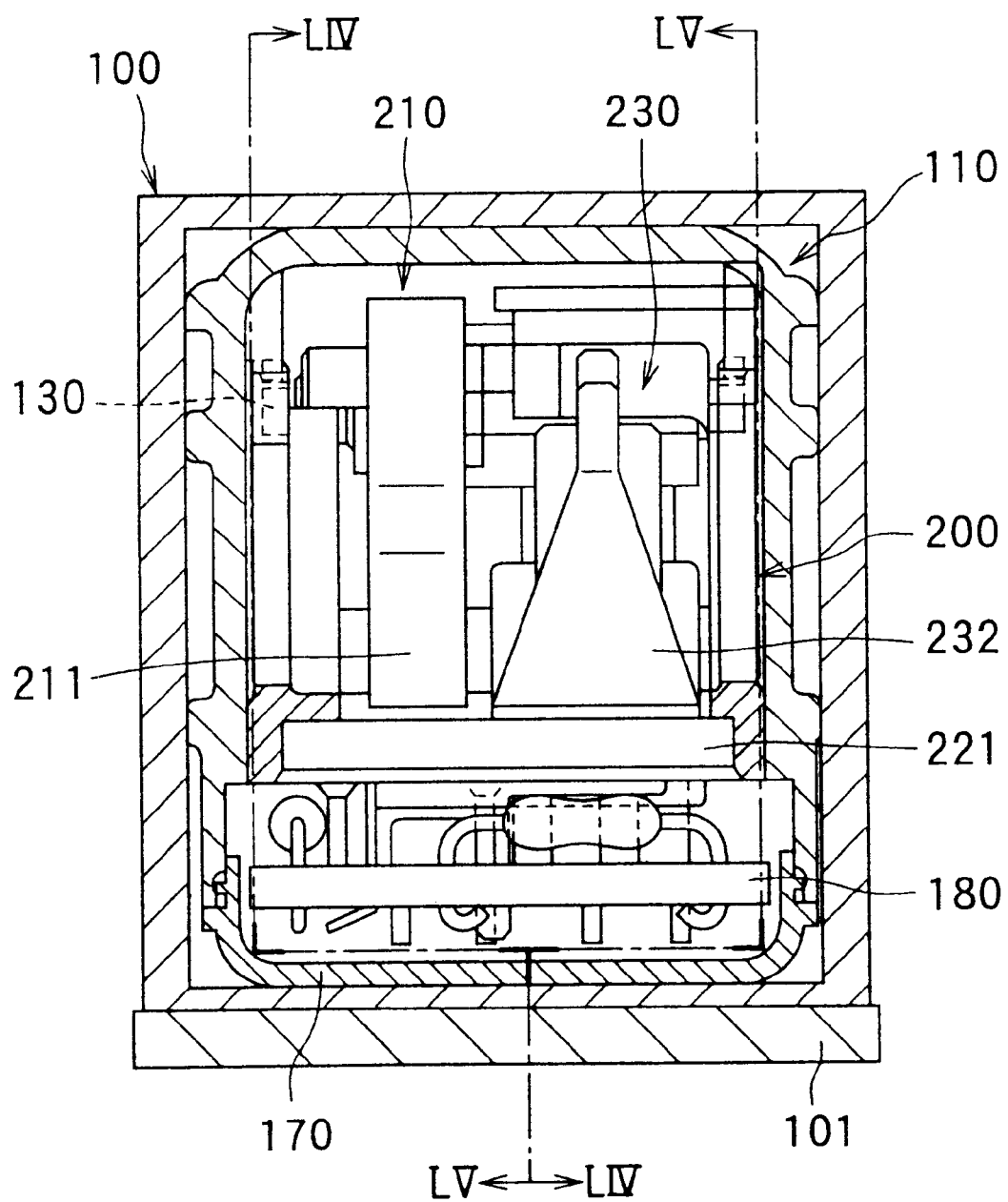
FIG. 53 is a diagram taken along the line 53—53 of FIG. 55 of an electro-mechanical impact detecting device according to the present invention.
Figure 54:
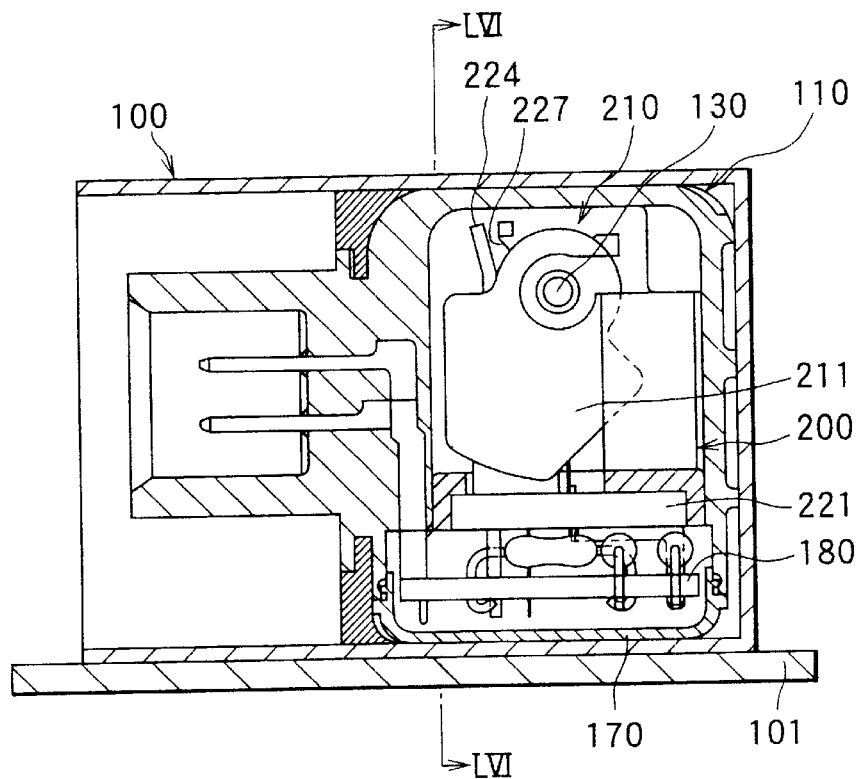
FIG. 54 is a diagram taken along the line 54—54 of FIG. 53 of an electro-mechanical impact detecting device according to the present invention.

The contact mechanism 220 has a base 221, which is coupled into the rectangular annular root section 201 of the casing 200 as shown in FIG. 49 through FIG. 52. The contact mechanism 220 has fixed contacts 222, 223 and 224 formed of elongate plates and moving contacts 225, 226 and 227 formed of elongate plates as shown in FIG. 51 and FIG. 52.

The fixed contact 222 in unison with the moving contact 225 constitutes the first switch, the fixed contact 223 in unison with the moving contact 226 constitutes the second switch, and the fixed contact 224 in unison with the moving contact 227 constitutes the third switch. The fixed contacts 222, 223 and 224 in parallel alignment are fed through a supporting wall section 221a and fixed to the base 221. The moving contacts 225, 226 and 227 in parallel alignment are fed through the supporting wall section 221a and fixed into the base 221 to confront the fixed contacts 222, 223 and 224, respectively, leftwardly in FIG. 52.

The flat-spring mechanism 230 has flat exerting springs 231 and 232 which are planted at their root section at virtually the center and on both sides of the base 221 as shown in FIG. 51. The flat exerting spring 231 extends upward from its root section, and is in resilient contact with the exerting cam 215 of the rotor 210 (rightwardly in FIG. 51). The flat exerting spring 232 extends up-leftward obliquely so as to confront the flat exerting spring 231 rightwardly in FIG. 51, and the flat exerting spring 232 has a protruding section 232a at its mid position, which points to the tip section of the flat exerting springs 231. The flat exerting springs 231 and 232 have no spacing at their root section. At its tip, the flat exerting spring 232 abuts rightward against a stopper 202 provided on the wall section of the casing 200. The remaining arrangement is virtually identical to the fourth embodiment.

In the fifth embodiment arranged as described above, in which the flat exerting springs 231 and 232 have no spacing at their root section, the flat exerting spring 231 is pushed by the exerting cam 215 of the rotor 210 during operation. The flat exerting spring 232 deviates together with the flat exerting spring 231 without transition of its contact point with the flat exerting spring 231 even after the tip section of the spring 231 contacts protruding section 232a of the spring 232. As such, there is no frictional force between the flat exerting springs 231 and 232. Accordingly, even if the flat exerting springs 231 and 232 undergo increased exertion force and spring constant, the impact detecting device can operate steadily without friction between the flat exerting springs 231 and 232. The remaining operation and effectiveness are virtually identical to the fourth embodiment.

FIG. 53 through FIG. 56 show the sixth embodiment of the electro-mechanical impact detecting device based on this invention. The sixth embodiment uses the flat exerting spring 231 to move contact 225 (or use the exerting flat-spring 161 described in the fourth embodiment also for moving contact 155), and uses the flat exerting spring 232 described in the fifth embodiment for the fixed contact 222 (or uses the flat exerting spring 162 for the moving contact 152). This reduces the cost of the impact detecting device by reducing the number of component parts.

Therefore, the sixth embodiment removes the contact cam 212 from the rotor 210 of the fifth embodiment. In addition, the fixed contact 222 and moving contact 225 are removed from the contact mechanism 220.

Figure 55:
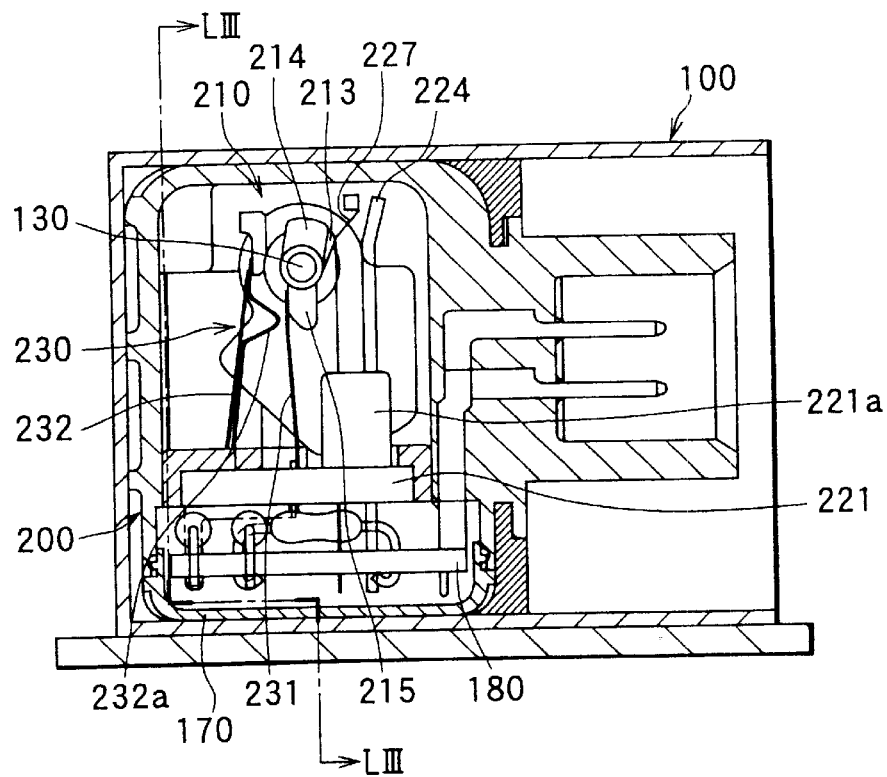
FIG. 55 A diagram taken along the line 55—55 of FIG. 53 of an electro-mechanical impact detecting device according to the present invention.
Figure 56:
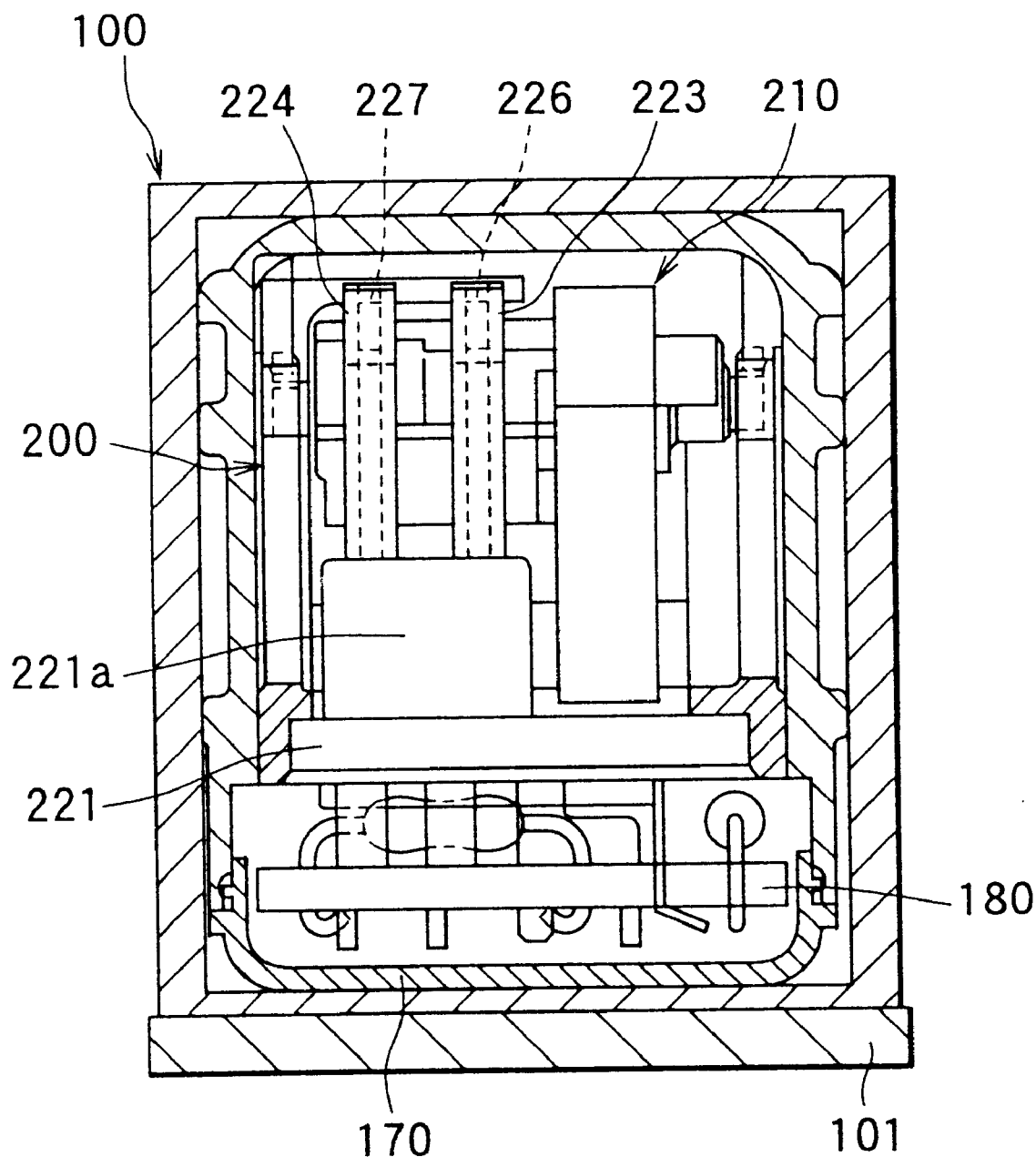
FIG. 56 is a diagram taken along the line 56—56 of FIG. 54 of an electro-mechanical impact detecting device according to the present invention.

The flat exerting spring 232 described in the fifth embodiment has its root section planted leftward into the base 221 by being spaced out from the root section of the flat exerting spring 231 as shown in FIG. 55. Due to the removal of the fixed contact 222 and moving contact 225, the flat exerting springs 231 and 232 substitute these contacts 222 and 225 thereby constituting the first switch. The remaining arrangement is identical to the fifth embodiment.

In the sixth embodiment as described above, when the rotor 210 rotates in response to vehicle deceleration, the flat exerting spring 231 is pushed at its tip section by the exerting cam 215 to move left in FIG. 55. When the rotor 210 further rotates in the same direction, the tip section of flat exerting spring 231 eventually contacts protruding section 232a of the flat exerting spring 232. This closes the first switch. Accordingly, the exerting action between the flat exerting spring 231 and exerting cam 215 is implemented together with the switch closing. This reduces the number of component parts.

When the rotor 210 further rotates in the same direction, it is subjected to the exertion forces of the flat exerting springs 231 and 232. Further rotation of the rotor 210 in the same direction causes moving contact 226 to contact fixed contact 223 and moving contact 227 to contact fixed contact 224 in the same manner as the fifth embodiment. The remaining operation and effectiveness of the impact detecting device is identical to the fifth embodiment.

Figure 57:
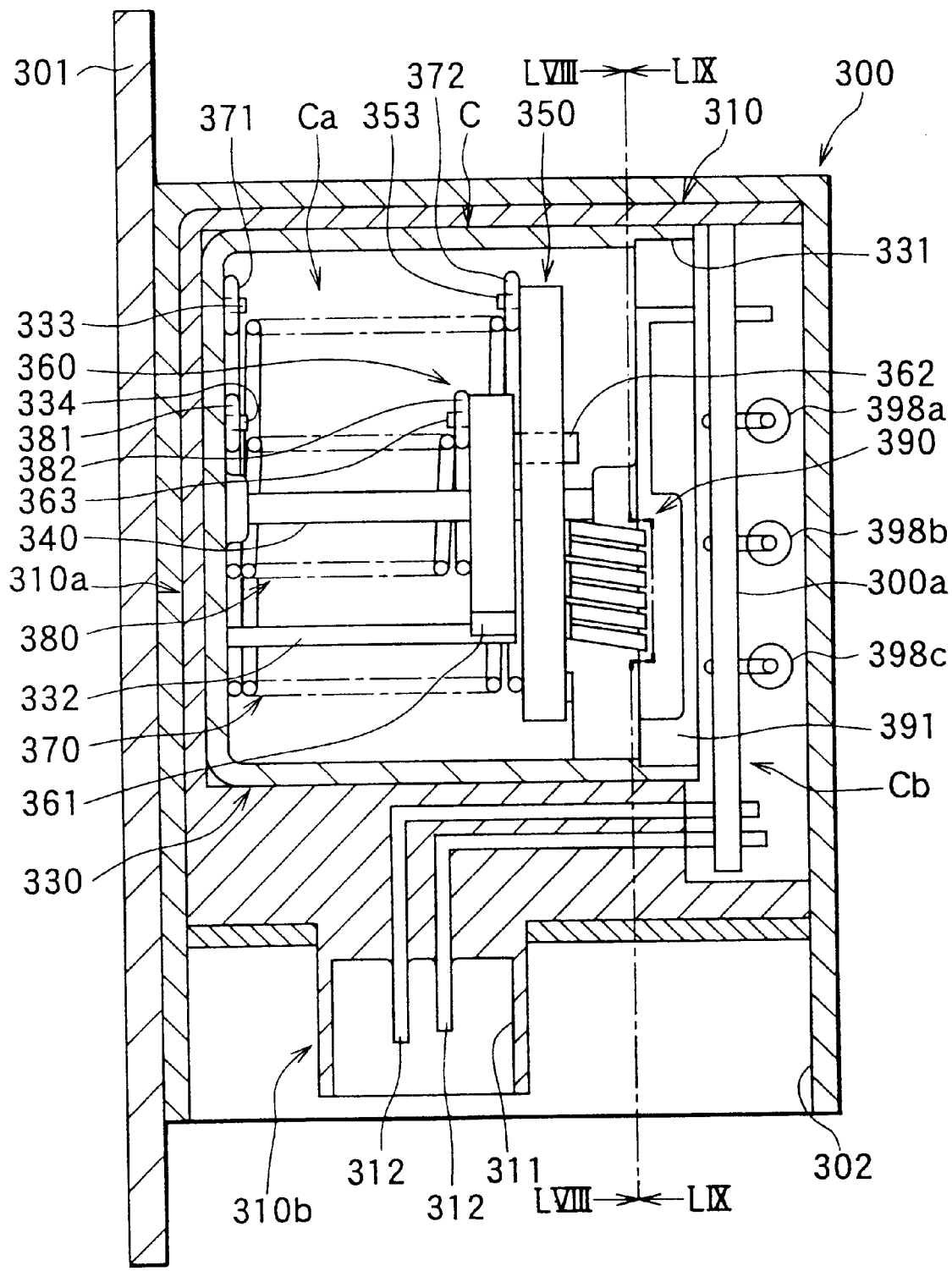
FIG. 57 is a longitudinal cross-sectional diagram of an electro-mechanical impact detecting device according to the present invention.
Figure 58:
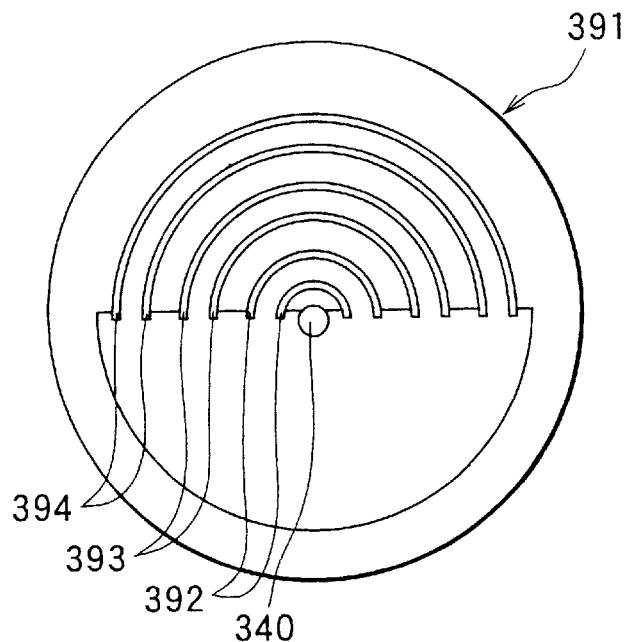
FIG. 58 is a diagram taken along the line 58—58 of FIG. 57 of an electro-mechanical impact detecting device according to the present invention.
Figure 59:
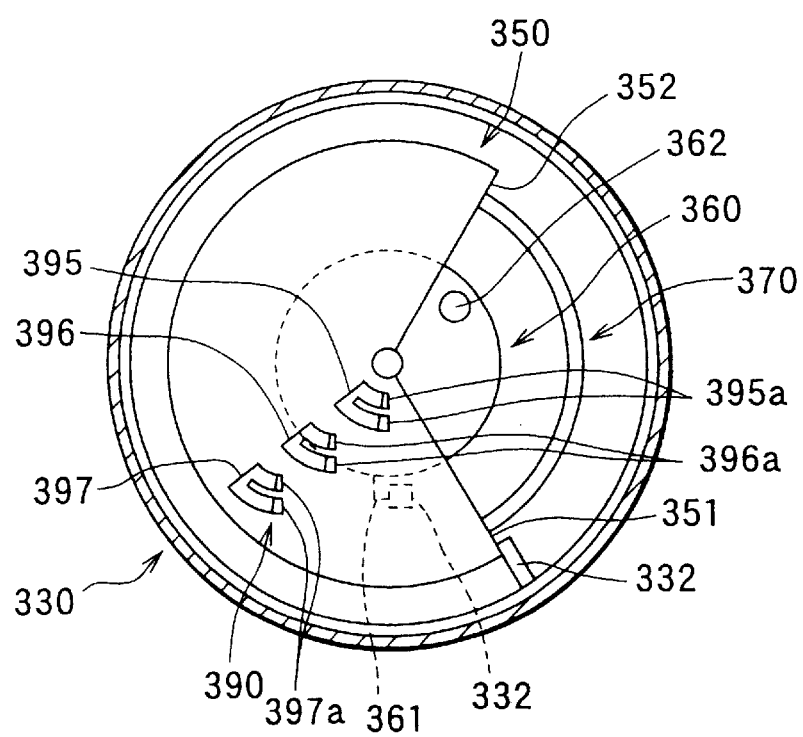
FIG. 59 is a diagram taken along the line 59—59 of FIG. 57 of an electro-mechanical impact detecting device according to the present invention.

FIG. 57 through FIG. 59 show the seventh embodiment of the electro-mechanical impact detecting device based on this invention. This impact detecting device is adopted in place of the impact detecting device of the first embodiment. This impact detecting device has an outer housing 300 and an inner housing 310, of which the housing 300 is fixed to the vehicle body at its location by a bracket 301 which is attached to the lower wall of the housing.

The inner housing 310 is fitted in the outer housing 300 as shown in FIG. 57. The housing 310 has a connector 310b which extends from and is integral with a housing section 310a. The housing section 310a is located deep within the housing 300 and the connector 310b is located in the opening section of the housing 300. The connector 310b confronts the outside at its connecting section 311 through an opening 302 of the housing 300. In FIG. 57, symbol 312 indicates terminals of the connector 310b.

This impact detecting device has a device main body C, which is fitted in the housing 310 as shown in FIG. 57. The device main body C includes a mechanical section Ca and an electrical circuit section Cb. The mechanical section Ca is fitted on the interior bottom of the housing section 310a, and the electrical circuit section Cb is fitted in the inner opening section of the housing section 310a.

The mechanical section Ca includes a casing 330, a rotation shaft 340, a main rotor 350, a sub rotor 360, two torsional coil springs 370 and 380, and a contact mechanism 390. The casing 330 is fitted to the interior bottom of the housing section 310a. The rotation shaft 340 is supported concentrically between the lower wall of the housing section 310a and the base 391 of contact mechanism 390 which is coupled into the opening 331 of the casing 330.

The main rotor 350 pivots concentrically with the rotation shaft 340 on the right in FIG. 57 of the rotation shaft 340 inside the casing 330. The main rotor 350 is formed of a plate weight, and has arcuate plate shape (a disc with a V-shaped section being cut away as shown in FIG. 59) to position its weight center eccentric from the rotation center. The main rotor 350, at its cut-off edge 351, initially abuts stopper 332 under the exertion force of the torsional coil spring 370, formed on the interior wall of casing 330 to protrude toward the axis of the casing 330 as shown in FIG. 59.

The sub rotor 360 pivots concentrically with rotation shaft 340, and the protrusion 361 of sub rotor 360 initially abuts rightward. Protrusion 361 is formed outwardly in the radial direction on the circumferential section of sub rotor 360. This abutment is under the exertion force of the torsional coil spring 378 against a protruding bar 332 (refer to FIGS. 57 and 59) which extends from part of the lower wall of the casing 330 as shown in FIG. 59.

The sub rotor 360 has a solid-cylindrical protrusion 362 as shown in FIGS. 57 and 59, and this protrusion 362 extends axially from the left-side plane in FIG. 57 of the sub rotor 360. Protrusion 362 is positioned where it is hit by another cut-off edge 352 of the main rotor 350 following a predetermined rotation in the clockwise direction in FIG. 59 (explained later). The sub rotor 360 has a smaller diameter as compared with the main rotor 350. Also, the sub rotor 360 is formed of a material having a small specific gravity, such as resin, and is lighter in weight than the main rotor 350.

Torsional coil springs 370 and 380 are coupled concentrically to the rotation shaft 340 inside casing 330, with springs 370 and 380 being held between the lower wall of the casing 330 and the main rotor 350 between the lower wall of the casing 330 and the sub rotor 360, respectively.

The torsional coil spring 370 has one end 371 caught by protrusion 333 which protrudes axially inward from the lower exterior wall section of the casing 330, and has another end section 372 caught by a protrusion 353 which protrudes axially from the circumferential section of the main rotor 350 to the lower wall section of the casing 330. Based on this attachment of torsional coil spring 370, it produces an exertion force in the counterclockwise direction in FIG. 59.

The torsional coil spring 380 has one end section 381 caught by a protrusion 334 which protrudes axially inward from the lower central wall of the casing 330. The coil has another end 382 caught by a protrusion 363 which protrudes axially from the circumferential section of the main rotor 350 to the lower wall section of the casing 330. Because of this attachment, coil spring 380 produces an exertion force in the counterclockwise direction in FIG. 59.

The contact mechanism 390 includes base 391, fixed contacts 392 through 394 and moving contacts 395 through 397. Fixed contacts 392 through 394 have concentric semi-circular shapes centered by the rotation axis of shaft 340 on the left-side plane of the base 391 (side of the main rotor 350). The fixed contacts 392 through 394 have increasing radius in this order.

The moving contacts 395 through 397 are disposed along circles having the same radii as fixed contacts 392 through 394 on the right-side plane of the main rotor 350. As such, the moving contacts 395 through 397 can confront the fixed contacts 392 through 394, respectively. The moving contacts 395 through 397 are disposed on the right-side plane of the main rotor 350 so that the distance in circumferential direction from the left extreme section in FIG. 58 of the moving contact 395 and fixed contact 392, the distance in circumferential direction from the left extreme section in FIG. 58 of the moving contact 396 and fixed contact 393, and the distance in circumferential direction from the left extreme section in FIG. 58 of the moving contact 397 and fixed contact 394 have ascending values in this order when the fixed contacts 392 through 394 are located above the axis of the rotation shaft 340 in FIG. 57.

The moving contact 395 has split contact sections 395a. These contact sections 395a are fixed at their root section to the right-side plane of the main rotor 350. The contact sections 395a extend from the root section to the tip section toward the fixed contact 392. Accordingly, the moving contact 395 in unison with the fixed contact 392 constitutes the above-mentioned first switch. The moving contact 396 has split contact sections 396a. These contact sections 396a are fixed at their root section to the right-side plane of the main rotor 350. The contact sections 396a extend from the root section to the tip section toward the fixed contact 393. Accordingly, the moving contact 396 in unison with the fixed contact 393 constitutes the above-mentioned second switch. The moving contact 397 has split contact sections 397a. These contact sections 397a are fixed at their root section to the right-side plane of the main rotor 350. The contact sections 397a extend from the root section to the tip section toward the fixed contact 394. Accordingly, the moving contact 397, in unison with the fixed contact 394, constitutes the above-mentioned third switch.

The electrical circuit section Cb has a printed circuit board 300a. The fixed contacts 392 through 394 and moving contacts 395 through 397 of the contact mechanism 390 are fed through the base 391 and printed circuit board 300a and connected to resistors 398a through 398c. The resistors 398a through 398c are equivalent to the resistors R1 through R3, respectively, described in the first embodiment. The moving contact 395 and fixed contacts 392 are equivalent to the moving contact 85 and fixed contacts 82 described in the first embodiment. The moving contact 396 and fixed contacts 393 are equivalent to the contact section 86a of the moving contact 86 and the fixed contacts 83 described in the first embodiment. The moving contact 397 and fixed contacts 394 are equivalent to the contact section 86b of the moving contact 86 and the fixed contacts 84 described in the first embodiment. Accordingly, the electrical circuit section Cb has a circuit arrangement identical to that of the first embodiment shown in FIG. 20. When the vehicle decelerates, the main rotor 350 works as a weight to rotate clockwise in FIG. 59 about the axis of the rotation shaft 340 in the same manner as the first embodiment. At this time, the sub rotor 360, which is lighter in weight than the main rotor 350 and is subjected to a large exertion force in the counterclockwise direction, does not rotate.

When the main rotor 350 further rotates, the distance in circumferential direction between the moving contact 395 and fixed contact 392 decreases. Eventually, the moving contact 395 contacts the fixed contact 392. When the main rotor 350 further rotates in the same direction, it abuts at another cut-off edge 351 against the stopper 362 of the sub rotor 360.

When the main rotor 350 further rotates in the same direction, it is subjected to the exertion forces of the two torsional coil springs 370 and 380 in the counterclockwise direction. With further rotation, the moving contact 396 contacts the fixed contact 393, and thereafter the moving contact 397 contacts the fixed contact 394.

During operation, with the main rotor 350 rotating only against the exertion force of the torsional coil spring 370, the impact detecting device operates based on the first impact level. Otherwise, when main rotor 350 rotates against the exertion forces of the two torsional coil springs 370 and 380, the impact detecting device operates based on the second and third impact levels. The relation among the rotation value of the main rotor 350, the exertion force acting on the main rotor 350 and the closing positions of the first through third switches (which correspond to the first through third impact levels) is identical to the case shown in FIG. 33.

In this embodiment, the moving contacts 395 through 397, which contact the fixed contacts 392 through 394, respectively, slide on the surface of the respective fixed contacts. In this case, only frictional forces exists, and there is no exertion force acting on the main rotor 350. Also, the exertion force and spring constant of the torsional coil spring 370 can be changed to alter the first through third impact levels.

FIGS. 60 through 63 show the eighth embodiment of the electro-mechanical impact detecting device of the invention. This impact detecting device is adopted in place of the impact detecting device of the first embodiment. This impact detecting device has an outer housing 400 and an inner housing 410, of which the housing 400 is fixed to the vehicle body at its proper location by a bracket 401 which is attached to the lower wall of the housing.

Figure 60:
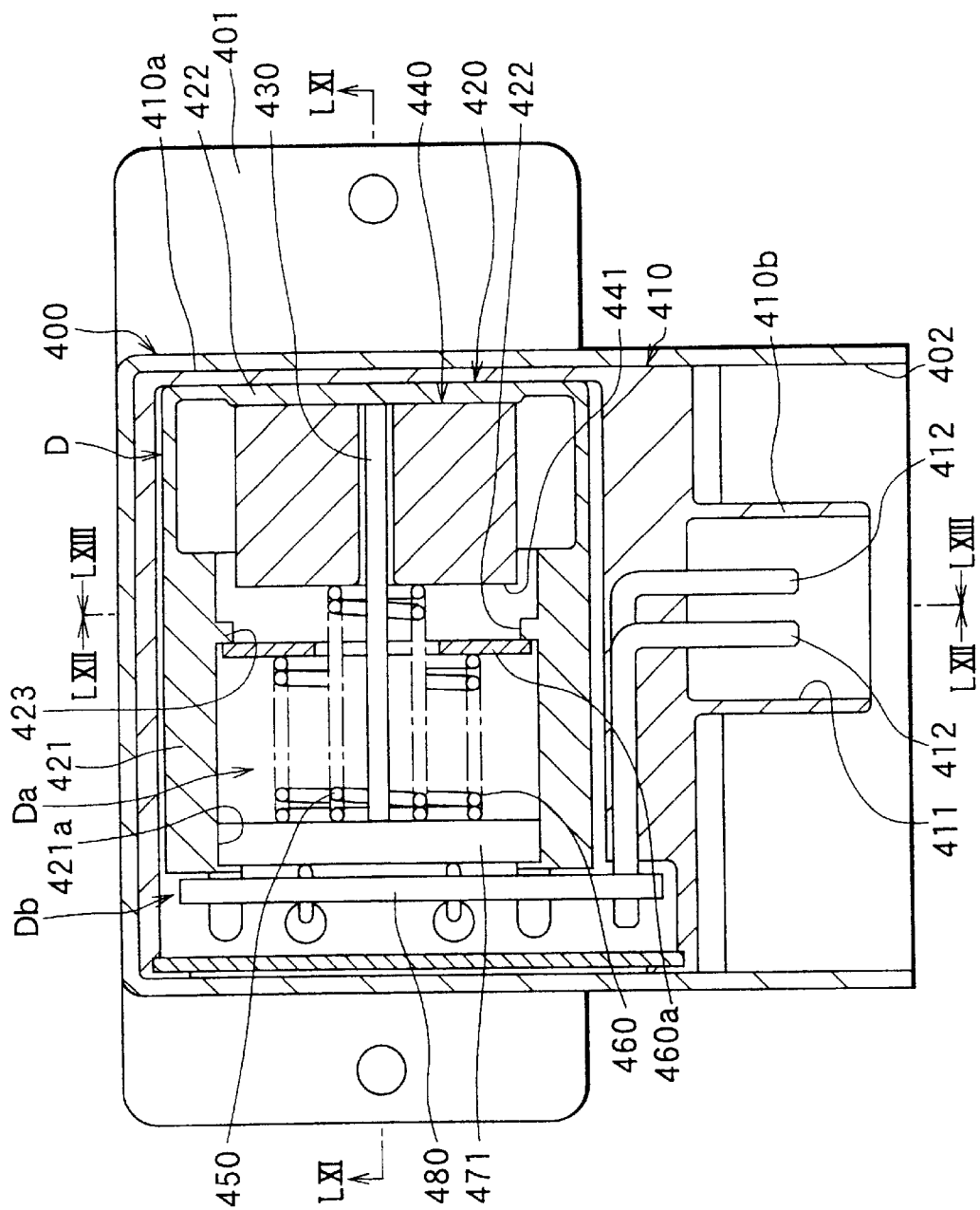
FIG. 60 is a longitudinal cross-sectional diagram showing the eighth embodiment of this invention of an electro-mechanical impact detecting device according to the present invention.
Figure 61:
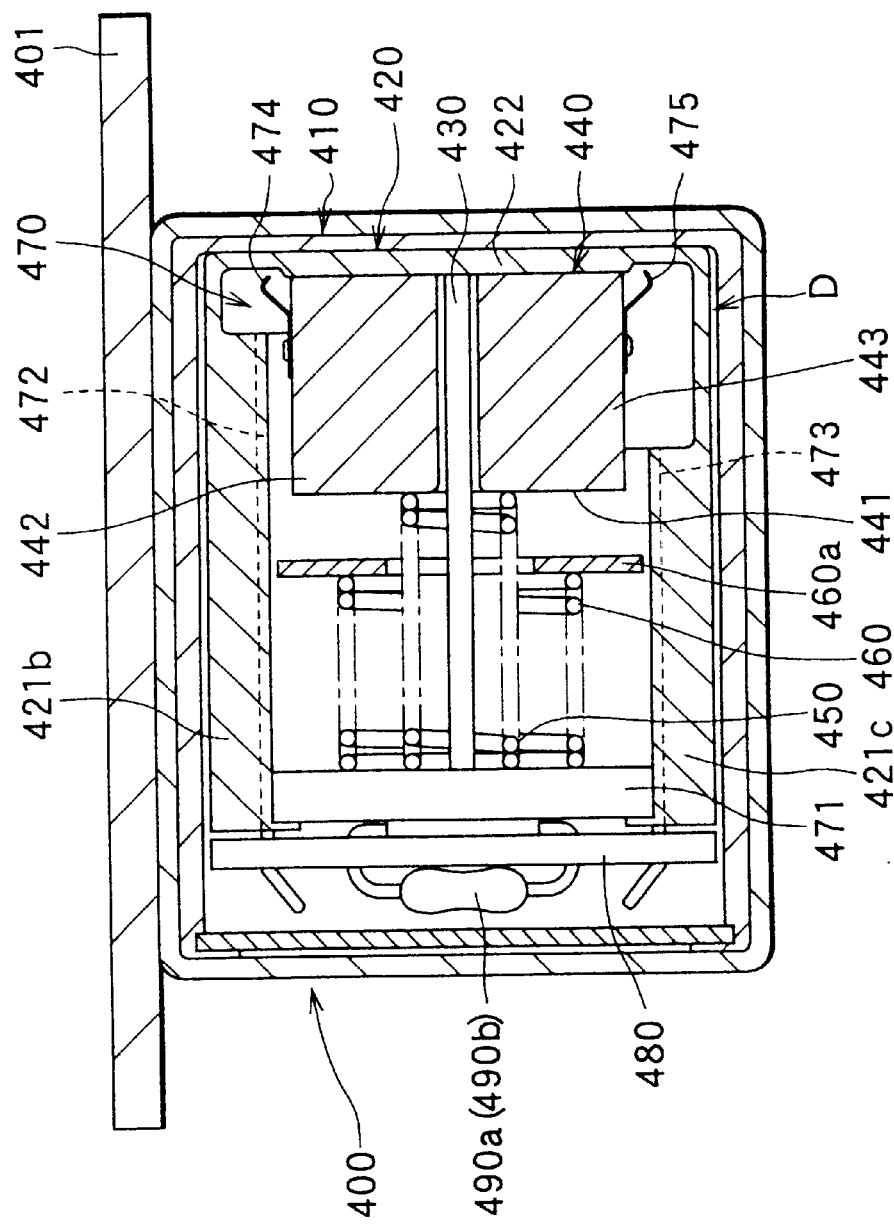
FIG. 61 is a diagram taken along the line 61—61 of FIG. 60 of an electro-mechanical impact detecting device according to the present invention.

The inner housing 410 is fitted in the outer housing 400 as shown in FIG. 61. The housing 410 has a connector 410b which extends from and is integral with a housing section 410a, and the housing section 410a is located in the deep section of the housing 400 and the connector 410b is located in the opening section of the housing 400. The connector 410b confronts the outside at its connecting section 411 through an opening 402 of the housing 400. In FIG. 60, symbol 412 indicates terminals of the connector 410b.

This impact detecting device has a device main body D, which is fitted in the housing 410 as shown in FIG. 60 and FIG. 61. The device main body D is constituted of a mechanical section Da and an electrical circuit section Db. The mechanical section Da is fitted on the interior bottom of the housing section 410a, and the electrical circuit section Db is fitted in the inner opening section of the housing section 410a.

The mechanical section Da includes a cylindrical casing 430, a shaft 420, a weight 440, compression springs 450 and 460, and a contact mechanism 390. The casing 420 is fitted on the interior bottom of the housing section 410a. The shaft 430 is supported concentrically between the lower wall of the casing 420 and the base 471 of contact mechanism 470 which is coupled into the opening 421 of the peripheral wall 421 of the casing 420.

Figure 62:
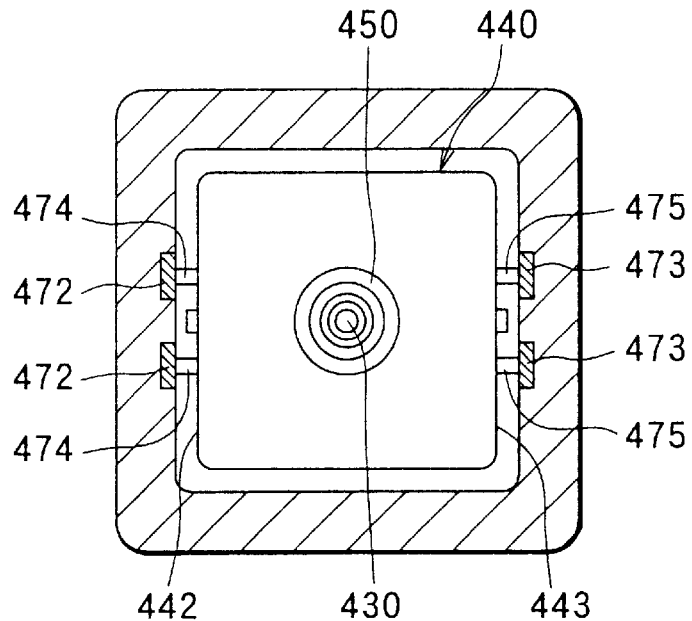
FIG. 62 is a diagram taken along the line 62—62 of FIG. 60 of an electro-mechanical impact detecting device according to the present invention.

The weight 440 has a shape of rectangular parallelepiped, and it is supported slidably and concentrically with the shaft 430 on the interior bottom of the casing 420 as shown in FIG. 60 through FIG. 62.

The compression spring 450 is coupled concentrically onto the shaft 430 in its section between the base 471 and the weight 440 inside the casing 420. The compression spring 450 exerts a force rightward in FIG. 60 to the weight 440 so that it is seated on the lower wall 422 of the casing 420. The compression spring 460 is coupled concentrically onto the compression spring 450 in its section between the base 471 and an exerting plate 460a inside the casing 420. The compression spring 460 exerts a force rightward in FIG. 60 to the exerting plate 460a so that it is seated on two protrusions 423 of the casing 420. The two protrusions 423 protrude from the interior surface of the circumferential wall 421 of the casing 420 toward the axis to confront each other. The distance between the left-side plane in FIG. 60 of the weight 440 which is seated on the lower wall 422 of the casing 420 and the right-side plane in FIG. 60 of the exerting plate 460a which is seated on the protrusions 423 is set to have a certain value.

Figure 63:
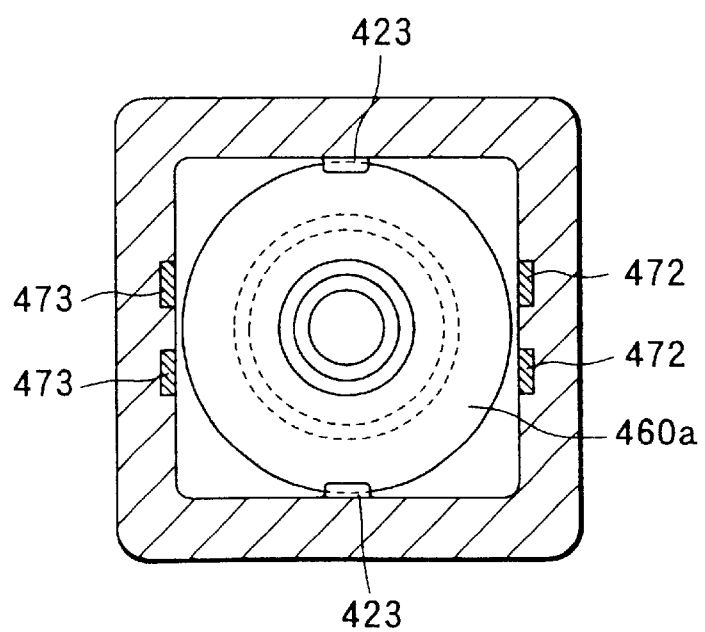
FIG. 63 is a diagram taken along the line 63—63 of FIG. 60 of an electro-mechanical impact detecting device according to the present invention.

The contact mechanism 470 includes two fixed contacts 472, two fixed contacts 473, two moving contacts 474 and two moving contacts 475. The two fixed contacts 472 are embedded by being spaced out from each other in one protruding wall section 421b. They extend along the inner surface of the wall 421 along the axial direction so that the two fixed contacts 472 are exposed to the interior of the casing 420 as shown in FIG. 61 through FIG. 63. The two fixed contacts 473 are embedded by being spaced out from each other in another protruding wall section 421c of the circumferential wall 421 of the casing 420 and extend axially along the inner surface of the wall 421 so that the two fixed contacts 473 are exposed to the interior of the casing 420 as shown in FIG. 61 through FIG. 63.

The protruding wall sections 421b and 421c protrude from the inner surface of the circumferential wall 421 of the casing 420 toward the axis to confront each other and axially extend on the inner surface of the circumferential wall 421. These protruding wall sections 421b and 421c are formed from the open end of the circumferential wall 421 of the casing 420 toward the lower wall 422, with the protruding wall section 421c being axially shorter than the protruding wall section 421b. The two fixed contacts 472 are axially shorter than the two fixed contacts 473 to match with the different lengths of the wall sections 421b and 421c (refer to FIG. 61).

The two moving contacts 474 are fixed on the weight 440 at positions on the sides 442 of the two fixed contacts 472. The moving contacts 474 extend outward from the sides 442 to contact contacts 472. When the weight 440 is seated on the lower wall 422, the tip sections of these moving contacts 474 are located on the right in FIG. 61 of the protruding wall section 421b do not-contact fixed contacts 472.

The two moving contacts 475 are fixed on the weight 440 on sides 443 of contacts 473. The moving contacts 475 confront the two moving contacts 474 on the opposite side of the weight 440 and extend outward from sides 443 to contact contacts 473. When the weight 440 is seated on the lower wall 422, the tip sections of these moving contacts 475 are located on the right in FIG. 61 of the protruding wall section 421c and do not contact the fixed contacts 473.

The electrical circuit section Db has a printed circuit board 480, and the fixed contacts 472 and moving contacts 474 and 475 of the contact mechanism 470 are fed through the printed circuit board 480 and connected to resistors 490a and 490b which are connected to the wiring section of the printed circuit board. The resistor 290a mates with the two fixed contacts 472 and two moving contact 474, and the resistor 290b mates with the two fixed contacts 473 and two moving contacts 475.

In the eighth embodiment, when the vehicle decelerates, the weight 440 slides along the shaft 430 against the exertion force of the compression spring 450. When the weight 440 further slide in the same direction, the distance between the two moving contacts 474 and the two fixed contacts 472 decreases, and eventually the moving contacts 474 contact fixed contacts 472.

When the weight 440 further slides, the weight 440 contacts (at its left-side plane 441) exerting plate 460a. With further sliding, the weight 440 undergoes additional exertion forces by the two compression springs 450 and 460. With further sliding against the exertion force of the two compression springs 450 and 460, the distance between the two moving contacts 475 and the two fixed contacts 473 decreases. Eventually the moving contacts 475 contact fixed contacts 473.

During operation, with the weight 440 sliding only against the exertion force of the compression spring 450, the impact detecting device operates based on the first impact level. Otherwise, when sliding against the exertion forces of the compression springs 450 and 460, the impact detecting device operates based on the second impact level. By greatly increasing the exertion force and spring constant of the compression spring 460 relative to compression spring 450, the first and second impact levels are altered. The amount of slide of weight 440, exertion force acting on the weight 440 and closing positions of the first and second switches is identical to the first embodiment.

The present invention is not confined in practice to automobiles, but it may be applied to electro-mechanical impact detecting devices equipped on other vehicles including buses and trucks. Also, the present invention is not confined in practice to air-bag systems, but it may be applied to electro-mechanical impact detecting devices for the vehicle occupant protection systems such as the seat-belt pretensioner for automobiles. The moving contact of the contact mechanism is not required for the exertion force acting on the rotor, a spring which produces the exertion force may be employed separately.

While the above-described embodiments refer to examples of usage of the present invention, it is understood that the present invention may be applied to other usage, modifications and variations of the same, and is not limited to the disclosure provided herein.

What is claimed is:

1. An electro-mechanical impact detecting device for a vehicle, the device comprising:
   a first rotating member, which pivots to rotate about a center of rotation in response to an impact acted on the vehicle, first rotating member having a center of mass that is eccentric from the rotation center;
   a second rotating member, which pivots to rotate about a center of rotation in response to the impact and has a center of mass that is eccentric from the rotation center of the second rotating member, wherein the first and second rotating members are adjacent to each other;
   a first switch, which closes a circuit at a first rotation value of the first rotating member corresponding to a first impact level of the impact; and
   a second switch, which closes a circuit at a second rotation value of the second rotating member corresponding to a second impact level of the impact, wherein the first and second rotating members are different in shape from each other such that a distance between the first rotating member and the rotation center of the first rotating member is different from that between the second rotating member and the rotation center of the second rotating member, and wherein at least the first and second impact levels are detected on a basis of closing of the switches.

2. The electro-mechanical impact detecting device according to claim 1 further comprising:
   a shaft, which rotatably supports the first and second rotating members; and
   an exerting means, which provides the shaft with a predetermined force that forces each rotating member to return to an initial position.

3. The electro-mechanical impact detecting device according to claim 1, wherein the first switch includes a first fixed contact and a first flat-spring moving contact, which is moved toward the first fixed contact by a rotational movement of the first rotating member, and wherein the second switch includes a second fixed contact and a second flat-spring moving contact, which is moved toward the second fixed contact by a rotational movement of the second rotating member.

4. The electro-mechanical impact detecting device in claim 3, wherein each rotating member includes a cam for pushing each flat-spring moving contact, wherein each flat-spring moving contact contacts a surface of each cam after each switch is closed as each cam rotates, and wherein the surface of each cam is shaped not to increase a bending value of each flat-spring moving contact.

5. An electro-mechanical impact detecting device for a vehicle according to claim 1, wherein the impact detecting device includes a detection signal generation means which generates detection signals in response to the closing of the switches at stepped values which match with at least the first and second impact levels.

6. An electro-mechanical impact detecting device for a vehicle according to claim 5, wherein:
   the second impact level is set greater than the first impact level;
   the detection signal generation means includes a first and second electrical load element, the detection signal generation means arranged as an electrical circuit including a closing circuit having one of the switches which is closed at the first impact level and the first electrical load element, and another closing circuit including one of the switches which disclosed at the second impact level and the first and second electrical load elements.

7. An electro-mechanical impact detecting device for a vehicle, the device comprising:
   a first rotating member, which pivots to rotate about a center of rotation in response to an impact acted on the vehicle and the first rotating member having a center of mass that is eccentric from the rotation center;
   a second rotating member, which pivots to rotate about a center of rotation in response to the impact and has a center of mass that is eccentric from the rotation center of the second rotating member, wherein the first and second rotating members are adjacent to each other;
   a first switch, which includes a first fixed contact and a first moving contact, which is moved toward the first fixed contact by a rotational movement of the first rotating member, for closing a circuit at a rotation value of the first rotating member corresponding to a first impact level of the impact; and
   a second switch, which includes a second fixed contact and a second moving contact, which is moved toward the second fixed contact by a rotational movement of the second rotating member, for closing a circuit at a rotation value of the second rotating member corresponding to a second impact level of the impact, wherein the second impact level is greater than the first impact level, wherein at least the first rotating member includes a cam for pushing the first moving contact, wherein the first moving contact contacts a surface of the cam after the first switch is closed as the cam rotates, wherein the surface of the cam is shaped not to increase a bending value of the first moving contact, and wherein at least the first and second impact levels are detected on a basis of closing of the first and second switches.

8. The electro-mechanical impact detecting device according to claim 7, further including:

a shaft, which rotatable supports the first and second rotating members; and an exerting means, which provides the shaft with a predetermined exertion force that forces each rotating member to return to an initial position.

9. The electro-mechanical impact detecting device according to claim 7, wherein each moving contact is made from a flat-spring.

* * * * *